(12) United States Patent
Hur et al.

(10) Patent No.: US 11,803,986 B2
(45) Date of Patent: Oct. 31, 2023

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Hyejung Hur, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 388 days.

(21) Appl. No.: 17/281,482

(22) PCT Filed: Mar. 2, 2020

(86) PCT No.: PCT/KR2020/002953
§ 371 (c)(1),
(2) Date: Mar. 30, 2021

(87) PCT Pub. No.: WO2021/025251
PCT Pub. Date: Feb. 11, 2021

(65) Prior Publication Data
US 2021/0407142 A1     Dec. 30, 2021

(30) Foreign Application Priority Data
Aug. 8, 2019    (KR) ........................ 10-2019-0096894

(51) Int. Cl.
*G06T 9/00*     (2006.01)
*G06T 9/40*     (2006.01)
*G06T 17/20*    (2006.01)

(52) U.S. Cl.
CPC ............... *G06T 9/001* (2013.01); *G06T 9/40* (2013.01); *G06T 17/205* (2013.01)

(58) Field of Classification Search
None
See application file for complete search history.

(56) References Cited

U.S. PATENT DOCUMENTS 11,454,710 B2 *   9/2022   Mammou ............... G06T 9/004
11,475,605 B2 *   10/2022   Flynn ................... H04N 19/167
(Continued)

FOREIGN PATENT DOCUMENTS

KR    1020180087348     8/2018
KR    1020190053129     5/2019
(Continued)

OTHER PUBLICATIONS

Mekuria et al., "Design, Implementation and Evaluation of a Point Cloud Codec for Tele-Immersive Video," IEEE Transactions on Circuits and Systems for Video Technology, vol. 27, dated Apr. 1, 2017, 15 pages.
(Continued)

*Primary Examiner* — Anand P Bhatnagar
(74) *Attorney, Agent, or Firm* — Fish & Richardson P.C.

(57) ABSTRACT

Disclosed herein is a method for transmitting point cloud data, the method including encoding point cloud data, and transmitting a bitstream containing the point cloud data. Disclosed herein is a method for receiving point cloud data, the method including receiving a bitstream containing point cloud data, decoding the point cloud data, and rendering the point cloud data.

20 Claims, 30 Drawing Sheets

(56) References Cited

U.S. PATENT DOCUMENTS

| | | | |
|---|---|---|---|
| 11,625,866 B2* | 4/2023 | Flynn | H04N 19/46 |
| | | | 382/240 |
| 2018/0081034 A1* | 3/2018 | Guo | G06F 16/5854 |
| 2020/0217937 A1* | 7/2020 | Mammou | G06T 9/004 |
| 2022/0159284 A1* | 5/2022 | Hur | H04N 21/2393 |
| 2022/0224940 A1* | 7/2022 | Hur | G06T 9/00 |
| 2022/0343548 A1* | 10/2022 | Park | H04N 21/4402 |
| 2023/0046917 A1* | 2/2023 | Flynn | H04N 19/119 |
| 2023/0052544 A1* | 2/2023 | Yuan | H01M 10/44 |
| 2023/0072818 A1* | 3/2023 | Mammou | H03M 7/3062 |

FOREIGN PATENT DOCUMENTS

| | | | | |
|---|---|---|---|---|
| WO | WO2019011637 | | 1/2019 | |
| WO | WO-2019011637 A1 * | | 1/2019 | G06T 9/40 |

OTHER PUBLICATIONS

PCT International Search Report and Written Opinion in International Appln. No. PCT/KR2020/002953, dated Jun. 26, 2020, 20 pages (with English translation).

* cited by examiner

FIG. 7
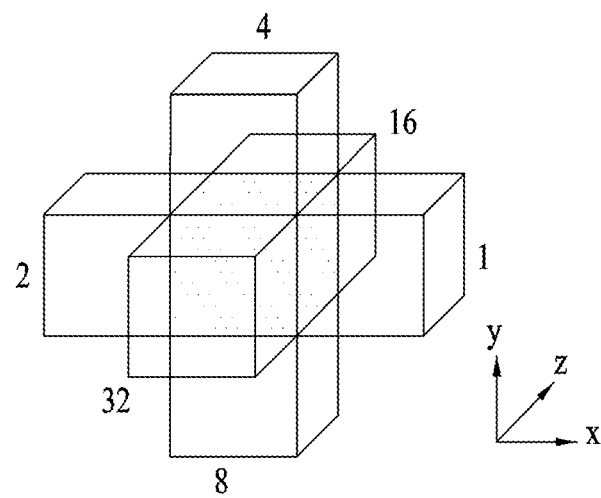
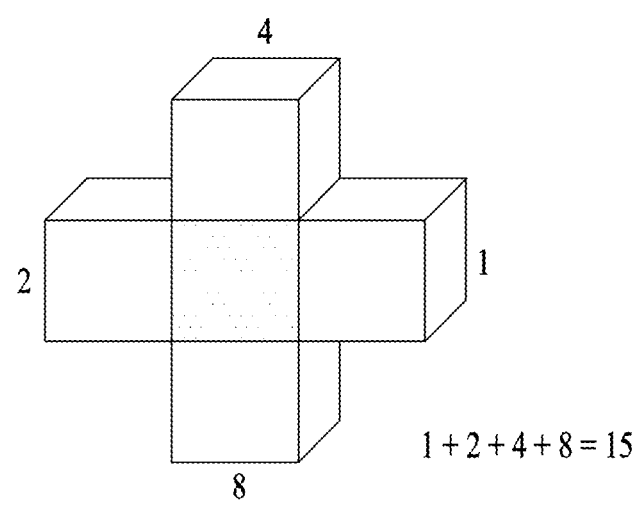
1 + 2 + 4 + 8 = 15

FIG. 23

| seq_parameter_set_rbsp( ) { | Descriptor |
|---|---|
| profile_idc | u(8) |
| profile_compatibility_flags | u(24) |
| level_idc | u(8) |
| sps_bounding_box_present_flag | u(1) |
| ... | |
| area_distribution_based_partition_flag | u(1) |
| if(area_distribution_based_partition_flag) { | |
|     area_distribution_based_partition_unit | u(2) |
|     area_distribution_based_partition_policy | u(2) |
|     area_distribution_based_partition_method | u(2) |
|     area_distribution_based_partition_axes_order | u(3) |
|     area_distribution_based_partition_method | u(1) |
|     if (area_distribution_based_partition_unit == 3) { | |
|         area_octree_overlap_handling_type | u(2) |
|     } | |
| } | |
| ... | |
| byte_alignment( ) | |
| } | |

FIG. 24

| seq_parameter_set_rbsp( ) { | Descriptor |
|---|---|
| profile_idc | u(8) |
| profile_compatibility_flags | u(24) |
| level_idc | u(8) |
| sps_bounding_box_present_flag | u(1) |
| ... | |
| area_distribution_based_partition_flag | u(1) |
| if(area_distribution_based_partition_flag) { | |
|    area_distribution_based_partition_unit | u(2) |
| } | |
| ... | |
| byte_alignment( ) | |
| } | |

FIG. 25

| tile_parameter_set( ) { | Descriptor |
|---|---|
| if(area_distribution_based_partition_flag) { | |
| area_distribution_based_partition_policy | u(2) |
| area_distribution_based_partition_method | u(2) |
| area_distribution_based_partition_axes_order | u(3) |
| area_distribution_based_partition_absolute_QP_flag | u(1) |
| if (area_distribution_based_partition_unit == 3) { | |
| area_octree_overlap_handling_type | u(2) |
| } | |
| } | |
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_size_width[ i ] | ue(v) |
| tile_bounding_box_size_height[ i ] | ue(v) |
| tile_bounding_box_offset_depth[ i ] | ue(v) |
| if (area_distribution_based_partition_unit == 1) { | |
| if(area_distribution_based_partition_method == 3) { | |
| area_distribution_based_partition_octree_traverse_index[ i ] | ue(v) |
| } | |
| area_distribution_based_partition_density[i] | ue(v) |
| area_distribution_based_partition_duplicated_point_merge_flag[ i ] | u(1) |
| area_distribution_based_partition_geometryQP[ i ] | ue(v) |
| area_distribution_based_partition_attributeQP[ i ] | ue(v) |
| } else if (area_distribution_based_partition_unit == 3) { | |
| num_bps_set[i] | ue(v) |
| for (j=0; j < num_bps_set[i] ; j++) { | |
| bps_block_ids[i][j] | ue(v) |
| } | |
| } | |
| byte_alignment( ) | |
| } | |

FIG. 26

| geometry_slice_header( ) { | Descriptor |
|---|---|
| gsh_geometry_parameter_set_id | ue(v) |
| gsh_tile_id | ue(v) |
| gsh_slice_id | ue(v) |
| if( gps_box_present_flag ) { | |
|   if( gps_gsh_box_log2_scale_present_flag ) { | |
|     gsh_box_log2_scale | ue(v) |
|     gsh_box_origin_x | ue(v) |
|     gsh_box_origin_y | ue(v) |
|     gsh_box_origin_z | ue(v) |
|   } | |
| } | |
| gsh_log2_max_nodesize | ue(v) |
| gsh_points_number | ue(v) |
| if(area_distribution_based_partition_flag) { | |
|   if(area_distribution_based_partition_method == 3) { | |
|     area_distribution_based_partition_octree_traverse_index[ i ] | ue(v) |
|   } | |
| if (area_distribution_based_partition_unit == 2) { | |
|   area_distribution_based_partition_density[i] | ue(v) |
|   area_distribution_based_partition_duplicated_point_merge_flag | u(1) |
|   area_distribution_based_partition_geometryQP | ue(v) |
| } else if (area_distribution_based_partition_unit == 3) { | |
|   area_octree_overlap_handling_type | u(2) |
|   num_bps_set[i] | ue(v) |
|   for (j=0; j < num_bps_set[i]; j++) { | |
|     bps_block_ids[i][j] | ue(v) |
|   } | |
| } | |
| } | |
| byte_alignment( ) | |
| } | |

FIG. 27

| block_parameter_set() { | Descriptor |
|---|---|
| gsh_reference_tile_id | ue(v) |
| gsh_reference_slice_id | ue(v) |
| bps_block_id | ue(v) |
| num_blocks | ue(v) |
| for( i = 0; i < num_blocks; i++ ) { | ue(v) |
| block_id[i] | ue(v) |
| block_bounding_box_x[i] | se(v) |
| block_bounding_box_y[i] | se(v) |
| block_bounding_box_z[i] | se(v) |
| block_bounding_box_size_width[i] | ue(v) |
| block_bounding_box_size_height[i] | ue(v) |
| block_bounding_box_size_depth[i] | ue(v) |
| if(area_distribution_based_partition_method == 3) { | |
| area_distribution_based_partition_octree_traverse_index[i] | ue(v) |
| } | |
| area_octree_overlap_handling_type | u(2) |
| if (area_octree_overlap_handling_type ==4) { | |
| block_virtual_bounding_box_offset_x[i] | ue(v) |
| block_virtual_bounding_box_offset_y[i] | ue(v) |
| block_virtual_bounding_box_offset_z[i] | ue(v) |
| block_virtual_bounding_box_size_width[i] | ue(v) |
| block_virtual_bounding_box_size_height[i] | ue(v) |
| block_virtual_bounding_box_size_depth[i] | ue(v) |
| } | |
| area_distribution_based_partition_density[i] | ue(v) |
| area_distribution_based_partition_duplicated_point_merge_flag[i] | u(1) |
| area_distribution_based_partition_geometryQP[i] | ue(v) |
| area_distribution_based_partition_attributeQP[i] | ue(v) |
| } | |
| byte_alignment() | |
| } | |

FIG. 28

| geometry_node( depth, nodeIdx, xN, yN, zN ) { | Descriptor |
|---|---|
| if( NeighbourPattern == 0 ) { | |
|    single_occupancy_flag | ae(v) |
|   if( single_occupancy_flag ) | |
|     occupancy_idx | ae(v) |
| } | |
| ... | |
| if( depth == MaxGeometryOctreeDepth − 1 ) { | |
|   // [NB ie NodeSize = 2] | |
|   if( !unique_geometry_points_flag || | |
|   (area_distribution_based_partition_flag && | |
|   (area_distribution_based_partition_unit == 3)) ) { | |
|    for( child = 0; child < GeometryNodeChildrenCnt; child++ ) { | |
|     num_points_eq1_flag | ae(v) |
|     if( !num_points_eq1_flag ) | |
|      num_points_minus2 | ae(v) |
|     if (area_octree_overlap_handling_type ==3) { | |
|      bps_reference_block_set_block_id | ue(v) |
|     } | |
|    } | |
|   } | |
| } else { | |
| ... | |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2020/002953, filed on Mar. 2, 2020, which claims the benefit of Korean Application No. 10-2019-0096894, filed on Aug. 8, 2019. The disclosures of the prior applications are incorporated by reference in their entirety.

TECHNICAL FIELD

Embodiments provide a method for providing point cloud content to provide a user with various services such as virtual reality (VR), augmented reality (AR), mixed reality (MR), and self-driving services.

BACKGROUND

A point cloud is a set of points in a three-dimensional (3D) space. It is difficult to generate point cloud data because the number of points in the 3D space is large.

A large throughput is required to transmit and receive data of a point cloud.

SUMMARY

An object of the present disclosure is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Embodiments are not limited to the above-described objects, and the scope of the embodiments may be extended to other objects that can be inferred by those skilled in the art based on the entire contents of the present disclosure.

To achieve these objects and other advantages and in accordance with the purpose of the disclosure, as embodied and broadly described herein, a method for transmitting point cloud data may include encoding point cloud data, and transmitting a bitstream containing the point cloud data.

In another aspect of the present disclosure, a method for receiving point cloud data may include receiving a bitstream containing point cloud data, decoding the point cloud data, and rendering the point cloud data.

The point cloud data transmission method, the point cloud data transmission apparatus, the point cloud data reception method, and the point cloud data reception apparatus according to the embodiments may provide a good-quality point cloud service.

The point cloud data transmission method, the point cloud data transmission apparatus, the point cloud data reception method, and the point cloud data reception apparatus according to the embodiments may achieve various video codec methods.

The point cloud data transmission method, the point cloud data transmission apparatus, the point cloud data reception method, and the point cloud data reception apparatus according to the embodiments may provide universal point cloud content such as a self-driving service.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 7 illustrates an example of a neighbor node pattern according to embodiments;

FIG. 23 illustrates an example of information on an overlap processing method in generating/reconstructing an octree according to embodiments;

FIG. 24 illustrates an example of information on an overlap processing method in generating/reconstructing an octree according to embodiments;

FIG. 25 illustrates an example of information on an overlap processing method in generating/reconstructing an octree according to embodiments;

FIG. 26 illustrates an example of information on an overlap processing method in generating/reconstructing an octree according to embodiments;

FIG. 27 illustrates an example of information on an overlap processing method in generating/reconstructing an octree and virtual bounding box information regarding position adjustment according to the overlap processing method in generating/reconstructing an octree according to embodiments;

FIG. 28 illustrates an example of block ID information according to an overlap processing method in generating/reconstructing an octree according to embodiments;

DETAILED DESCRIPTION

Best Mode

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
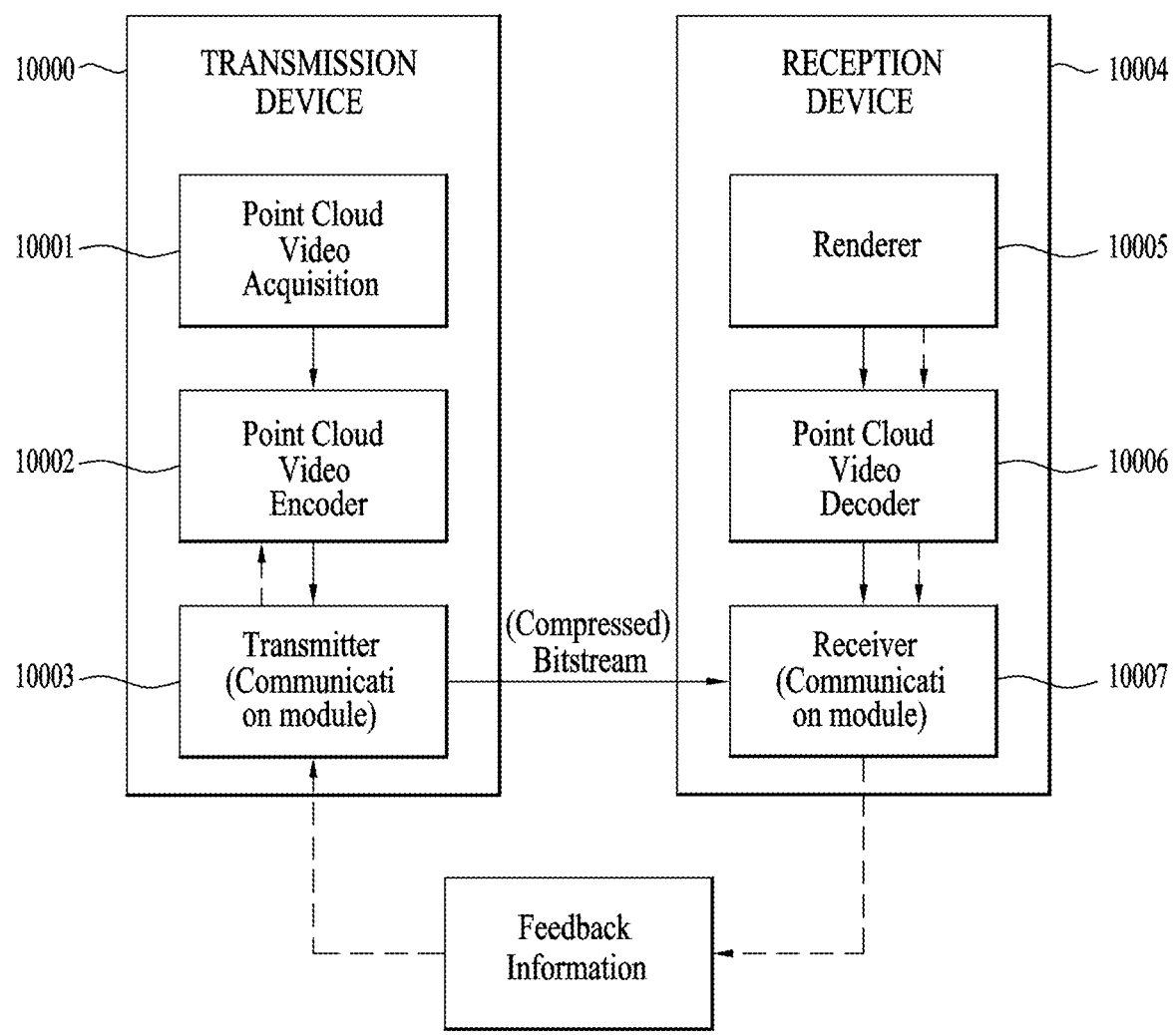
FIG. 1 illustrates an exemplary point cloud content providing system according to embodiments.

FIG. 1 illustrates an exemplary point cloud content providing system according to embodiments.

A point cloud data transmission device 10000 according to the embodiments may include a point cloud video acquirer (Point Cloud Video Acquisition) 10001, a point cloud video encoder 10002, and/or a transmitter (or communication module) 10003.

The point cloud video acquirer 10001 acquires a point cloud video through a process of capturing, synthesizing, or generating a point cloud video.

The point cloud video encoder 10002 encodes the point cloud video data.

The transmitter (or communication module) 10003 transmits the encoded point cloud video data in the form of a bitstream.

A point cloud data reception device 10004 according to the embodiments may include a receiver 10005, a point cloud video decoder 10006, and/or a renderer 10007.

The receiver 10005 according to the embodiments receives a bitstream containing point cloud video data. According to embodiments, the receiver 10005 may transmit feedback information to the point cloud data transmission device 10000.

The point cloud video decoder 10006 decodes the received point cloud video data.

The renderer 10007 renders the decoded point cloud video data. According to embodiments, the renderer 10007 may transmit the feedback information obtained at the reception side to the point cloud video decoder 10006. The point cloud video data according to the embodiments may carry feedback information to the receiver. According to embodiments, the feedback information received by the point cloud transmission device may be provided to the point cloud video encoder.

Embodiments may provide a method of providing point cloud content to provide a user with various services such as virtual reality (VR), augmented reality (AR), mixed reality (MR), and self-driving.

In order to provide a point cloud content service, a point cloud video may be acquired first. The acquired point cloud video may be transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

According to embodiments, the process of providing point cloud content (or point cloud data) may be referred to as a point cloud compression process. According to embodiments, the point cloud compression process may represent a geometry-based point cloud compression process.

Each element of the point cloud data transmission device and the point cloud data reception device according to the embodiments may be hardware, software, a processor, and/or a combination thereof.

A method for transmitting point cloud data according to embodiments includes encoding point cloud data, transmitting a bitstream containing the point cloud data.

A method for receiving point cloud data according to embodiments includes receiving a bitstream containing point cloud data, decoding the point cloud data, and rendering the point cloud data.

Figure 2:
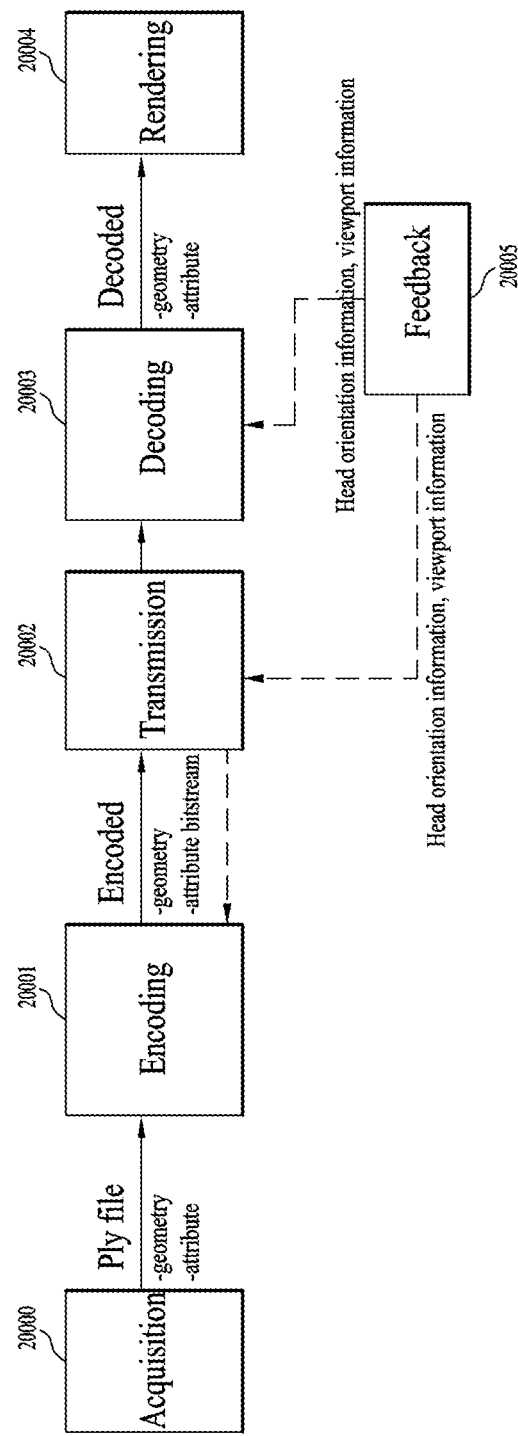
FIG. 2 illustrates a process for providing point cloud content according to embodiments.

FIG. 2 illustrates a process for providing point cloud content according to embodiments A point cloud data transmission method and point cloud data reception method according to embodiments include acquisition 20000, encoding 20001, transmission 20002, decoding 20003, rendering 20004 and/or feedback 20005.

The acquisition 20000 is an operation of acquiring point cloud data. The point cloud data according to embodiments may be a Ply (Polygon File format or Stanford Triangle format) file. The Ply file includes geometry and/or attributes. The geometry represents points in a 3D space. The attributes represent properties such as color and reflection of each point in a 3D space according to the geometry.

The encoding 20001 is an operation of encoding the point cloud data containing geometry and/or attributes. The encoded data may be in the form of a bitstream.

The transmission 20002 is an operation of transmitting the encoded data. The transmission device receives feedback information from the reception device. The received feedback information may be delivered to the encoding according to embodiments.

The decoding 20003 is an operation of receiving the bitstream and decoding point cloud data contained in the bitstream. The decoding operation may acquire feedback information about a user according to embodiments.

The rendering 20004 is an operation of rendering the decoded data containing the geometry and/or attributes.

The feedback 20005 is an operation of acquiring the feedback information from the receiving end and/or the user and providing the acquired feedback information to the point cloud data transmission method and the point cloud data reception method according to the embodiments. The feedback information includes information about the user. For example, the feedback information includes head orientation information related to the user and viewport information related to the user. The feedback information may be provided to the decoder of the receiver and/or the transmitter. Point cloud data corresponding to the user's head orientation and/or viewport may be encoded/decoded. User-related data may be efficiently encoded/decoded without the need to encode/decode data for all viewing positions.

The process for providing a point cloud content service according to the embodiment is configured as follows.

Point cloud compression processing may include a geometry-based point cloud compression process.

A point cloud compression system may include the transmission device and the reception device according to the embodiments. According to embodiments, the transmission device may be referred to as an encoder, a transmission apparatus, a transmitter, or the like. According to embodiments, the reception device may be referred to as a decoder, a reception apparatus, a receiver, or the like. The transmission device may output a bitstream by encoding a point cloud video, and deliver the same to the reception device through a digital storage medium or a network in the form of a file or a stream (streaming segment). For example, the digital storage medium may include various storage media such as a USB, SD, CD, DVD, Blu-ray, HDD, and SSD.

The transmission device may include a point cloud video acquirer, a point cloud video encoder, and a transmitter. The reception device may include a receiver, a point cloud video decoder, and a renderer. The encoder may be referred to as a point cloud video/picture/picture/frame encoder, and the decoder may be referred to as a point cloud video/picture/picture/frame decoding device. The transmitter may be included in the point cloud video encoder. The receiver may be included in the point cloud video decoder. The renderer may include a display. The renderer and/or the display may be configured as separate devices or external components. The transmission device and the reception device may further include a separate internal or external module/unit/component for the feedback process. Each element included in the transmission device and the reception device may be composed of hardware, software and/or a processor.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the Stanford Triangle format) file may be generated. For a video having multiple frames, one or more files may be acquired. During the capture process, point cloud related metadata (e.g., capture related metadata) may be generated.

The point cloud video encoder may encode the input point cloud video into one or more video streams. One video may include multiple frames, each of which may correspond to a still image/picture. In this specification, a point cloud video may include a point cloud image/frame/picture. The term "point cloud video" may be used interchangeably with a point cloud image/frame/picture. The point cloud video encoder may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into geometry and attributes, which will be described later. In this case, the output bitstream may include a geometry bitstream and/or an attribute bitstream. The attributes may include (color) texture information.

An encapsulator may encapsulate, in the form of a file or streaming, the encoded video/image information or data and/or output in the form of a bitstream. The transmitter may transmit the point cloud bitstream or the file/segment including the bitstream to the receiver of the reception device over a digital storage medium or network. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and deliver the extracted bitstream to the decoding device.

The point cloud video decoder may receive the bitstream and decode the video/image by performing an operation corresponding to the operation of the point cloud video encoder. In this case, the point cloud video decoder may decode the point cloud video by dividing the same into geometry and attributes as described below. For example, the point cloud video decoder may reconstruct (decode) the geometry from the geometry bitstream included in the input bitstream, and reconstruct (decode) the attributes based on the attribute bitstream included in the input bitstream and the reconstructed geometry. A 3D point cloud video/image may be reconstructed based on the position information according to the reconstructed geometry and the (color) texture attribute according to the decoded attributes. As described above, the attributes may include (color) texture information.

The renderer may render the decoded point cloud video/image. The rendered video/image may be displayed through the display unit. The user may view the entire or partial region of the rendered result through a VR/AR display or a general display.

The feedback process may include transferring various kinds of feedback information that may be acquired in the rendering/displaying process to the transmitting side or to the decoder of the receiving side. Interactivity may be provided through the feedback process in consuming point cloud video. According to embodiments, head orientation information, viewport information indicating a region currently viewed by the user, and the like may be transmitted in the feedback process. According to embodiments, the user may interact with those implemented in the VR/AR/MR/autonomous driving environment. In this case, information related to the interaction may be transmitted to the transmitting side or the service provider in the feedback process. According to embodiments, the feedback process may be skipped.

As described above, embodiments relate to point cloud video compression. For example, the methods described in the embodiments may be applied to the point cloud compression or point cloud coding (PCC) standard (e.g., G-PCC or V-PCC standard) of the moving picture experts group (MPEG) or the next generation video/image coding standard.

Figure 3:
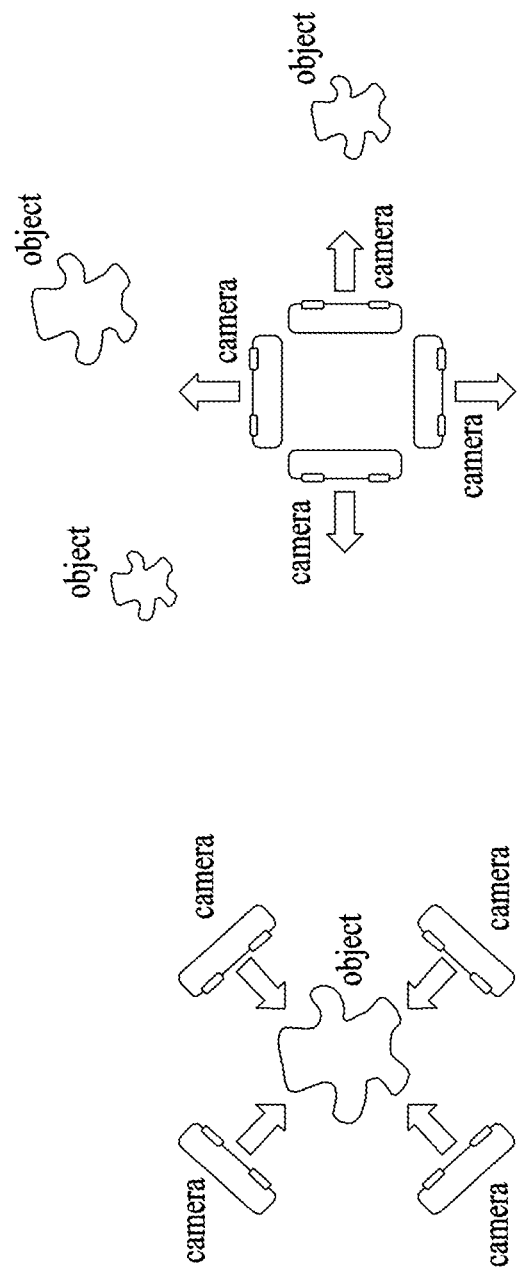
FIG. 3 shows the arrangement of point cloud capture equipment according to embodiments.

FIG. 3 shows the arrangement of point cloud capture equipment according to embodiments.

Point cloud data according to embodiments may be acquired by a camera or the like. A capturing technique according to embodiments may include, for example, inward-facing and/or outward-facing.

In the inward-facing according to the embodiments, one or more cameras inwardly facing an object of point cloud data may photograph the object from the outside of the object.

In the outward-facing according to the embodiments, one or more cameras outwardly facing an object of point cloud data may photograph the object. For example, according to embodiments, there may be four cameras.

The point cloud data or the point cloud content according to the embodiments may be a video or a still image of an object/environment represented in various types of 3D spaces.

1. Point Cloud Content Acquisition Process According to Embodiments:

This process represents a process of acquiring a point cloud video through the process of capturing, synthesizing, or generating a point cloud video. In the acquisition process, data about 3D positions (x, y, z)/attributes (color, reflectance, transparency, etc.) of multiple points, for example, a polygon file format (PLY) (or the Stanford triangle format) file may be generated. For a video having multiple frames, one or more files may be acquired. In the capture process, capture related metadata may be generated.

1.1 Point Cloud Video Capture Through Equipment According to Embodiments

For capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, z) and color (YCbCr or RGB) or reflectance (r) of the points.

For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as self-driving, the configuration of the capture camera may be based on the outward-facing technique. Because the point cloud content may be captured by multiple cameras, a camera calibration process may need to be performed before the content is captured to configure a global coordinate system for the cameras.

1.2 Point Cloud Video Synthesis Other than the Equipment According to the Embodiments The point cloud content according to the embodiments may be a video or still image of an object/environment presented in various types of 3D spaces.

Additionally, in the point cloud content acquisition method, any point cloud video may be composed based on the captured point cloud video.

Alternatively, when a point cloud video for a computer-generated virtual space is to be provided, capturing with an actual camera may not be performed. In this case, the capture process may be replaced simply by a process of generating related data.

1.3 Point Cloud Video Post-Processing According to Embodiments

Post-processing may be needed for the captured point cloud video to improve the quality of the content.

In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed.

In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

Figure 4:
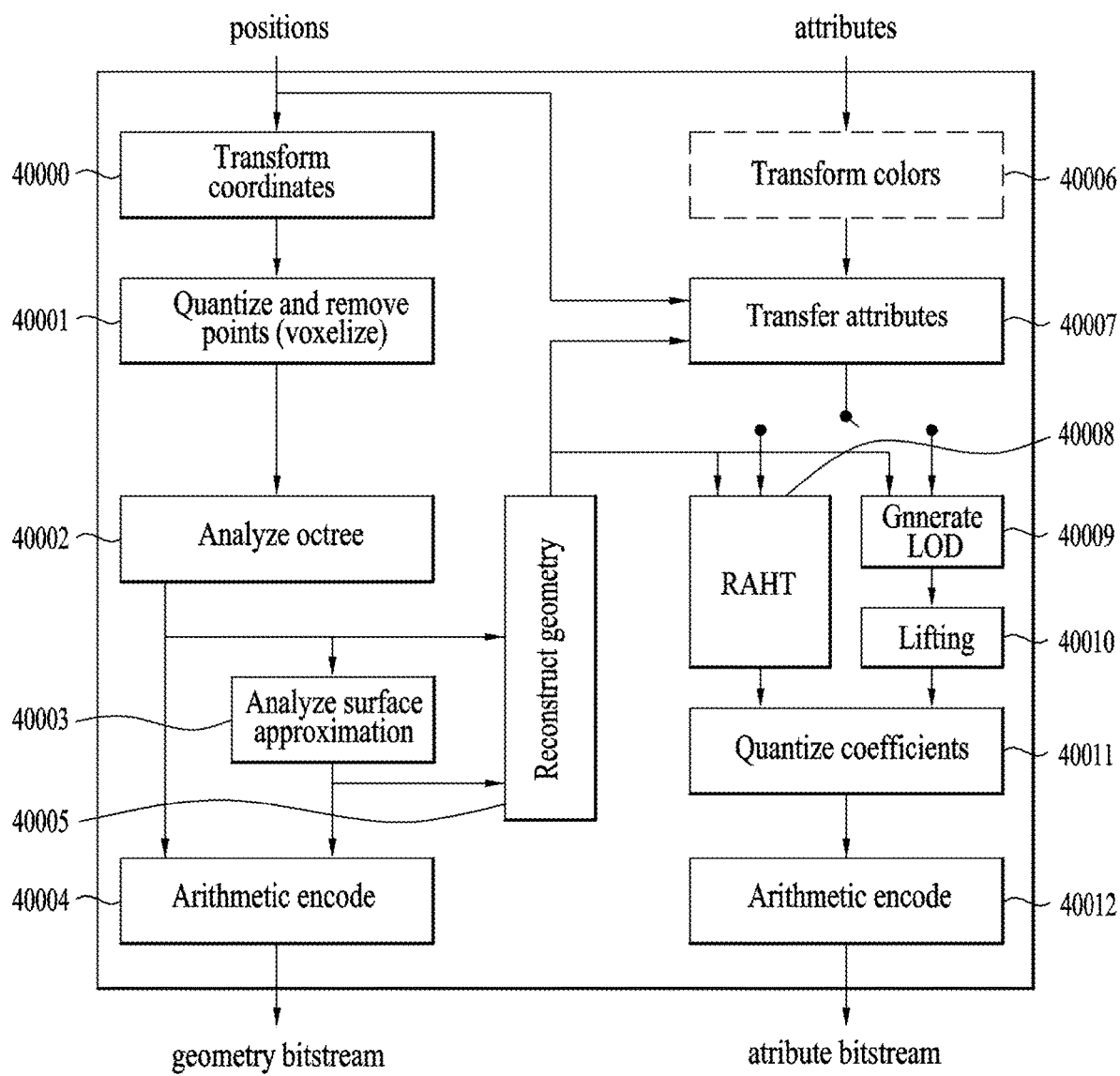
FIG. 4 illustrates a point cloud encoder according to embodiments.

FIG. 4 illustrates a point cloud encoder according to embodiments.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer (Transform coordinates) 40000 according to the embodiments receives positions and transforms the same into coordinates. For example, the positions may be transformed into 3D (XYZ) position information. The position information in the 3D space according to the embodiments may be referred to as geometry information.

The quantizer (Quantize and remove points (voxelize)) 40001 according to the embodiments quantizes the geometry information. For example, it may quantize the points by adjusting the positions thereof based on a minimum position value of the points. The quantizer 40001 may voxelize the points. Voxelization refers to the minimum unit expressing position information in 3D space.

The octree analyzer (Analyze octree) 40002 presents voxels in an octree structure. The octree according to the embodiments represents points matched with voxels, based on a tree structure. The octree represents points for a voxel space based on a tree structure.

The surface approximation analyzer 40003 (Analyze surface approximation) may analyze and approximate the octree. The octree analysis and approximation according to the embodiments is a process of analyzing a region containing a plurality of points to efficiently provide octree and voxelization.

The arithmetic encoder (Arithmetic encode) 40004 encodes the octree and/or the approximated octree. For example, the encoding scheme includes arithmetic encoding. As a result of the encoding, a geometry bitstream is generated.

The geometry reconstructor (Reconstruct geometry) 40005 reconstructs the octree and/or the approximated octree. The geometry reconstructor 40005 reconstructs the octree/voxels based on the result of analyzing the distribution of points.

The color transformer (Transform colors) 40006 transforms color values (or textures) included in the attributes. For example, the format of color information may be transformed. The color transformer 40006 may be optional according to a color value. The color transform 40006 is one of the point cloud attribute coding schemes.

The attribute transformer (Transfer attributes) 40007 transforms attribute information based on positions and/or reconstructed geometry information. For example, based on the position value of a point included in a voxel, the attribute transformer 40007 may transform an attribute value of the point at the position. The attribute transformation 40007 is one of the point cloud attribute coding schemes.

The RATH transformer 40008 corresponds to an encoding method for predicting attribute information based on the reconstructed geometry information. For example, the RATH transformer 40008 may predict attribute information of a node at a higher level of the octree based on the attribute information associated with a node at a lower level of the octree. The RATH transform 40008 is one of the point cloud attribute coding schemes.

The LOD generator (Generate LOD) 40009 generates a level of detail (LOD) for points. The LOD according to the embodiments is a unit of a group that distinguishes points. Points may be classified by LOD. The attribute coding scheme using the LOD scheme according to embodiments may be referred to as prediction transformation.

The lifting transformer 40010 represents a method of organizing points for each LOD and transforming an attribute value of a point cloud based on a weight. The lifting transform 40010 is one of the point cloud attribute coding schemes.

As the point cloud attribute coding scheme according to the embodiments, RAHT transformation, LOD generation and lifting transformation, or a scheme according to a combination of RAHT/LOD/lifting may be used.

The coefficient quantizer (Quantize coefficients) 40011 quantizes the attribute-coded point cloud data based on coefficients.

The arithmetic encoder (Arithmetic encode) 40012 encodes the quantized point cloud data based on an arithmetic coding scheme.

Each component of the point cloud encoder according to the embodiments may be executed by hardware, software, a processor, and/or a combination thereof. Detailed operations of each component of the point cloud encoder will be described below.

2. Point Cloud Data Encoding Process According to Embodiments

For the acquired point cloud data, position/color information about the points may be reconstructed and encoded in order to adjust the quality of the point cloud content (e.g., lossless, lossy, near-lossless) according to network conditions or applications.

The process of reconstructing/encoding the position information about the points may be referred to as geometry coding, and the process of reconstructing/encoding attribute information (e.g., color) associated with each point may be referred to attribute coding.

2.1 Point Cloud Geometry Coding According to Embodiments

Each point in the acquired point cloud may be transmitted without loss. However, in this case, real-time streaming is not possible because the size of the content data is large. In an example, there is point cloud content of 60 Gbps at 30 fps. The content data size may vary depending on the capture device. In order to provide a point cloud content service, it is necessary to reconstruct the content according to the maximum target bitrate.

2.1.1 Quantization of Positions of Points According to Embodiments

The first step in reconstructing the position information about each point of the entire acquired point cloud is the quantization process for the position information. The minimum x, y, z position values of all points are estimated, subtracted from the position values of each point, multiplied by a set quantization scale value, and then rounded to the nearest integer value.

2.1.2 Voxelization of Points According to Embodiments

In order to reconstruct each point of the point cloud to which the quantization process is applied, octree-based voxelization is performed based on the position information about the points.

In order to store information about points present in 3D space as in the case of pixels, which are the smallest units having 2D image/video information, a 3D cubic space generated by dividing a 3D space into units (unit=1.0) based on each axis (x-axis, y-axis, z-axis) is called a voxel, and a process of matching a point present in the 3D space with a specific voxel is called voxelization. The term "voxel" is a compound that combines volume and pixel. The spatial coordinates of a voxel may be estimated based on a positional relationship with a voxel group, and may have color or reflectance information as in the case of pixels.

Figure 5:
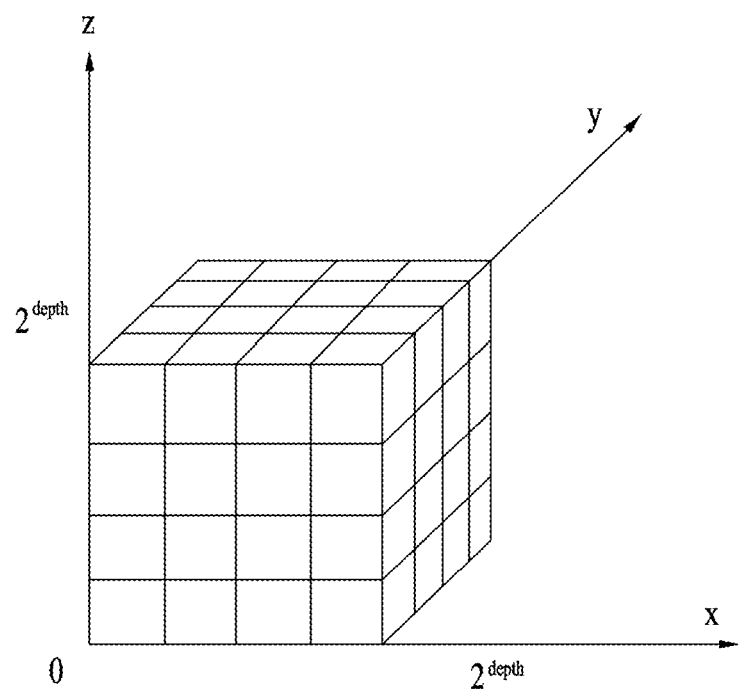
FIG. 5 illustrates voxels in a 3D space according to embodiments.

FIG. 5 illustrates voxels in a 3D space according to embodiments.

One voxel may not only have one point. One voxel may have multi-point-related information. Alternatively, the information may be integrated into one-point information in one voxel. This adjustment may be performed selectively. When one voxel is represented by one point, the position value of the center of the voxel may be set based on the position values of points present in the voxel, and it is necessary to perform an attribute transform process related thereto. For example, the attribute transform process may adjust the values to the average of the color or reflectance of the points included in the voxel or neighboring points within a specific radius from the center position value of the voxel (refer to Section 2.2.2).

Figure 6:
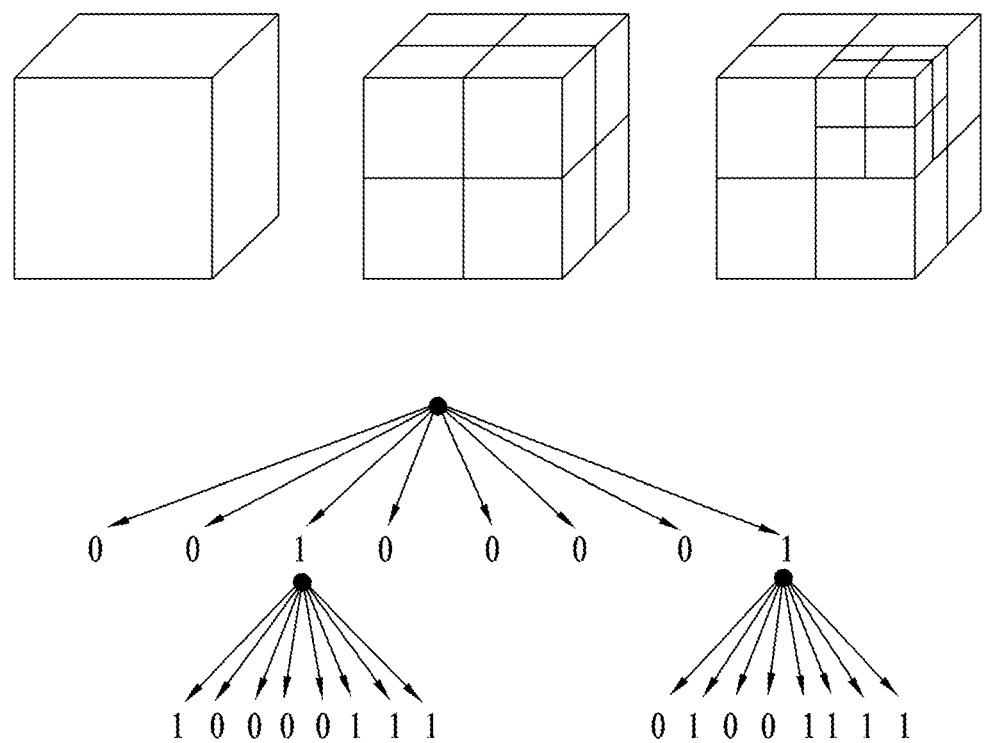
FIG. 6 illustrates an example of an octree and occupancy code according to embodiments.

FIG. 6 illustrates an example of an octree and occupancy code according to embodiments.

2.1.3 Octree for Management of Occupied Voxel According to Embodiments

In order to efficiently manage the regions/positions of these voxels, point cloud contents use an octree.

When the entire space is divided based on the x-axis and y-axis in order to efficiently manage the space of the 2D image, 4 spaces are created. When each of the 4 spaces is divided based on the x-axis and y-axis, 4 spaces are generated for each small space. The regions are divided until the leaf node becomes a pixel. In order to efficiently manage the regions by size and position thereof, a data structure of a quadtree may be used. Similarly, the same method is applied to efficiently manage the 3D space according to the position and size of the space. However, since the z-axis is added, 8 spaces are created when a space is divided based on the x-axis, y-axis, and z-axis. When each of the 8 spaces is divided based on the x-axis, y-axis, and z-axis again, 8 spaces are created for each of the small spaces. The regions are divided until the leaf node becomes a pixel, and an octree data structure capable of managing eight child node regions may be used to efficiently manage the regions by size and position.

Since the octree is used to manage voxels reflecting the positions of points, the total volume of octree should be set to $(0,0,0)$ to $(2^d, 2^d, 2^d)$. $2^d$ is set to a value that constitutes the smallest bounding box surrounding the entire point of the point cloud video, and d is the depth of the octree. The value of d may be estimated in the following equation. $(x\_n^{int}, y\_n^{int}, z^+ n^{int})$ is the position values of the points obtained through the quantization process.

$$d = \text{Ceil}(\text{Log } 2(\text{Max}(x_n^{int}, y_n^{int}, z_n^{int}, n=1, \ldots, N)+1))$$

The octree may be expressed as an occupancy code. When a point is included in each node, this is indicated by 1. When there is no point at each node, this is indicated by 0. Each node has an 8-bit bitmap indicating occupancy for 8 child nodes. Entropy coding of occupancy code is performed through an arithmetic coder. The generated occupancy code may be directly encoded or may be encoded through an intra/inter-coding process to increase compression efficiency. The receiver may reconstruct the octree based on the occupancy code.

2.1.4 Method for Processing for Sparse Octree According to Embodiments

The voxelization and octree are used to store the position information about the points of the point cloud video. However, for a specific region where there are not many points, it may be inefficient to voxelize the entire region. For example, there may be few points in a specific region, and thus it may not be necessary to construct the entire octree. In this case, early termination is needed. In this case, the specific region, that is, a specific node of the octree (other than a leaf node), may not be divided into 8 sub-nodes (child nodes). Instead, the position of points for the region may be directly transmitted, or a surface model may be used to reconstruct the positions of the points in the node region based on voxels.

In order to enable the direct mode, in which the position of each point of a specific node is directly transmitted, it may be checked whether the following conditions are satisfied. The option to use the direct mode should be enabled; the node should not be a leaf node; points whose number is less than or equal to a threshold should be present within the specific node; and the total number of points whose point positions may be directly transmitted should not be exceeded. When all these conditions are satisfied, the position values of the points may be directly entropy-coded with an arithmetic coder for the node and transmitted.

2.1.5 Method for Applying Geometry Trisoup According to Embodiments

A trisoup mode, in which a specific level of the octree (a level lower than the depth d of the octree) may be determined, and the surface model may be used staring with that level to selectively apply the trisoup mode in which the positions of points in the node region may be reconstructed based on voxels. When the trisoup mode is used, the level at which the trisoup method is to be applied is specified. For example, when the specified level is the same as the depth of the octree, the trisoup mode is not applied. The specified level should be lower than the depth value of the octree to apply the trisoup method. The 3D cube region of nodes of the specified level is called a block. One block may include one or more voxels. The block or voxel may correspond to a brick. Each block may have 12 edges, and it is checked whether each edge is adjacent to an occupied voxel having a point (occupied voxel). Each edge may be adjacent to multiple occupied voxels. A specific position of an edge adjacent to a voxel is called a vertex. When several occupied voxels are adjacent to one edge, the average position of the corresponding positions may be determined as a vertex. When there is a vertex, the starting point of the edge (x, y, z), the direction vector of the edge ($\Delta x$, $\Delta y$, $\Delta z$), and vertex position values (relative position values within the edge) may be entropy-coded by the arithmetic coder.

When such a method is used, a geometry reconstruction process may be performed through triangle reconstruction, up-sampling, and voxelization.

In order to reconstruct a triangle based on the starting point of the edge, the direction vector of the edge, and the position value of the vertex, 1) the centroid value of each vertex is calculated, 2) the centroid value is subtracted from each vertex value, and 3) the sum of the squares of the values obtained by the subtraction is estimated.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix} \quad 1)$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad 2)$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad 3)$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of $\theta$ is estimated through a tan 2(bi, ai), and the vertices are ordered based on the value of $\theta$. The method of constructing triangles according to the number of vertices is to create triangles by combining vertices according to the sorted order as shown in the following table. For example, when there are 4 vertices, two triangles may be constructed. The first triangle consists of the first, second, and third vertices among the ordered vertices, and the second triangle consists of the third, fourth and first vertices.

TABLE

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. Such points are called refined vertices. Refined vertices are voxelized, and attributes (e.g., color) are coded based on the voxelized position values in attribute coding.

According to embodiments, the trisoup process is an optional process.

FIG. 7 illustrates an example of a neighbor node pattern according to embodiments 2.1.6 Geometry Coding According to Embodiments The position/color data of the points of the point cloud content may be reconstructed, and entropy coding may be performed using the arithmetic coder. Because the data of point cloud video is large, compression efficiency may be an important factor. Accordingly, context adaptive arithmetic coding may be applied to increase compression efficiency.

Geometry coding encodes the occupancy code of each node in the octree. Although the occupancy code may be entropy coded directly using the arithmetic code, it may be adaptively encoded based on the occupancy status of neighbor nodes (intra-based operation) or based on the occupancy code of the previous frame (inter-based operation). Here, the frame may refer to a set of point cloud data generated at the same time. The compression efficiency may depend on how many neighbor nodes are referenced. Increase in bits may complicate the operation, but the compression efficiency may be increased by making them biased to one side. For example, when a 3-bit context is given, coding needs to be performed for $2^3=8$ cases. The part divided for coding affects the complexity of implementation. Accordingly, it is necessary to meet an appropriate level of compression efficiency and complexity.

In each node of the octree, coding may be adaptively performed based on the occupancy status of neighbor nodes. To this end, a value of a neighbor pattern is obtained based on the occupancy status of the neighbor node. The bit order of neighbor nodes by position is shown in the figure. For example, when neighbor nodes corresponding to 1, 2, 4, and 8 are occupied, 15, which is the sum of 1, 2, 4, and 8, becomes the neighbor node pattern value of the corresponding node. In general, six neighbor nodes that share faces of the node are referenced. The neighbor node pattern obtained according to the occupancy status of the six neighbor nodes is composed of a value of $2^6=64$, and 64 different kinds of coding may be performed. Alternatively, complexity may be reduced in encoding by changing the neighbor node pattern value through a table that internally changes 64 to 10 or 6. Compression efficiency may be improved by performing encoding using the occupied code of the current node and the neighbor node pattern value.

According to embodiments, the intra/inter coding process is an optional process and may be skipped.

2.2 Point Cloud Attribute Coding According to Embodiments

Voxelization may be applied. In the direct mode, points may be rearranged to the front of the point cloud data. In the trisoup mode, triangle reconstruction, upsampling, and voxelization may be added to perform the encoding process for related attribute information based on the reconstructed geometry. Since attribute information is dependent on geometry, a process of coding the attribute information based on the reconstructed geometry may be needed.

Point cloud attribute data may be composed of color (YCbCr or RGB) or reflectance (r) information. In both cases, the same coding method may be applied. However, the difference is that the color has 3 elements and the reflectance has one element, and each element may be treated independently.

Attribute coding methods may include prediction transform, lifting transform, and region adaptive hierarchical transform (RAHT), and may be selectively applied.

2.2.1 Color Transform According to Embodiments

Coding may be performed by changing the color from RGB to YCbCr. Color transform refers to a color format transform process.

2.2.2 Attribute Transform According to Embodiments

When there is only one point in one voxel, the position values of the points present in the voxel are set to the center point of the voxel in order to represent single-point information for one voxel. Thus, a process of transforming associated attribute values may be needed. The attribute transform process is performed even in trisoup mode.

The attribute transform process may calculate the average of the values of an attribute such as color or reflectance of neighbor points within a specific radius from the center position value of the voxel, or the average of the values obtained by applying a weight according to the distance from the center position. In this case, each voxel has a position and a calculated attribute value.

In searching for neighbor points present within a specific position/radius, a K-D tree or Morton code may be used. The K-D tree is a binary search tree and supports a data structure that may manage points based on position such that the nearest neighbor search (NNS) may be quickly performed. The Morton code may be generated by mixing bits of 3D position information (x, y, z) for all points. For example, when (x, y, z) is (5, 9, 1), corresponding bit representation is (0101, 1001, 0001), and mixing the bits with a bit index in order of z, y, x yields 010001000111, which corresponds to 1095. 1095 is a Morton code value for (5, 9, 1). Points may be sorted based on the Morton code, and NNS may be performed through a depth-first traversal process.

There may be a case where the NNS is required in another transform process for attribute coding after the attribute transform process. The K-D tree or Morton code may be used in this case.

Figure 8:
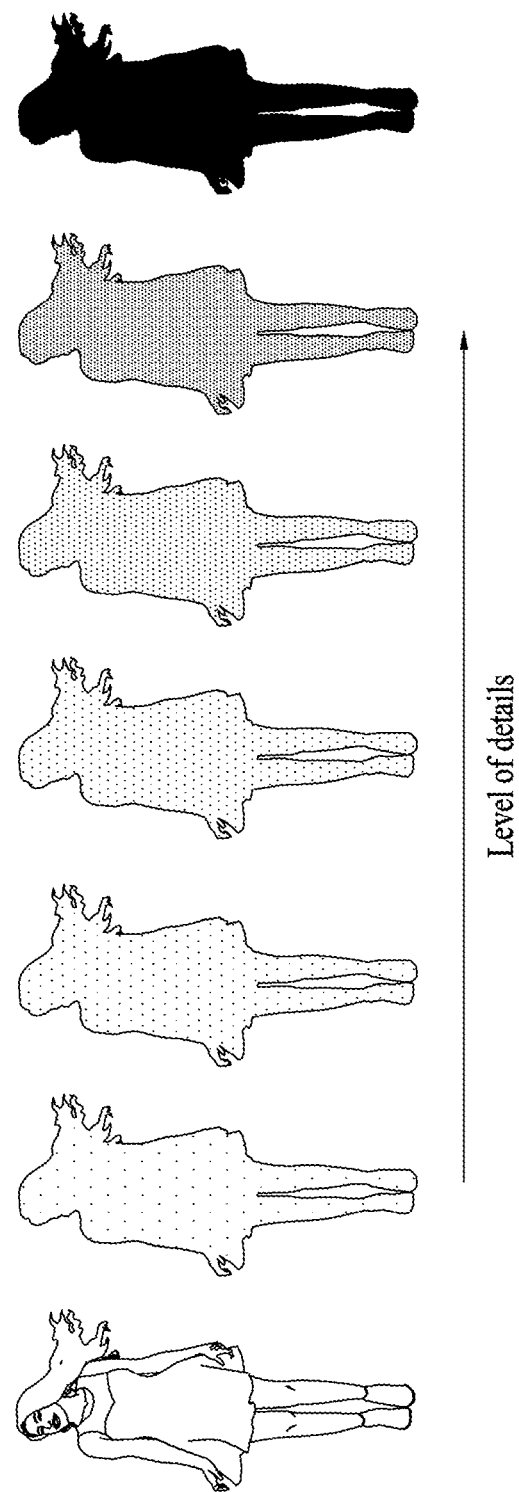
FIG. 8 illustrates an example of point configuration of point cloud content for each LOD according to embodiments.

FIG. 8 illustrates an example of point configuration of point cloud content for each LOD according to embodiments.

Point clouds according to the embodiments may be classified into groups according to a level of detail (LOD). As shown in the figure, the LOD increases from left to right. In other words, when the position moves to the left, the points become sparse. When the position moves to the right, the distance between the points decreases.

2.2.2.1 Prediction Transformation According to Embodiments

Prediction transform is a method employing the Level Of Detail (LOD) technique. Each point is set by calculating the LOD value based on the set LOD distance value. For example, points may be configured according to LOD values as shown in the following figure.

Figure 9:
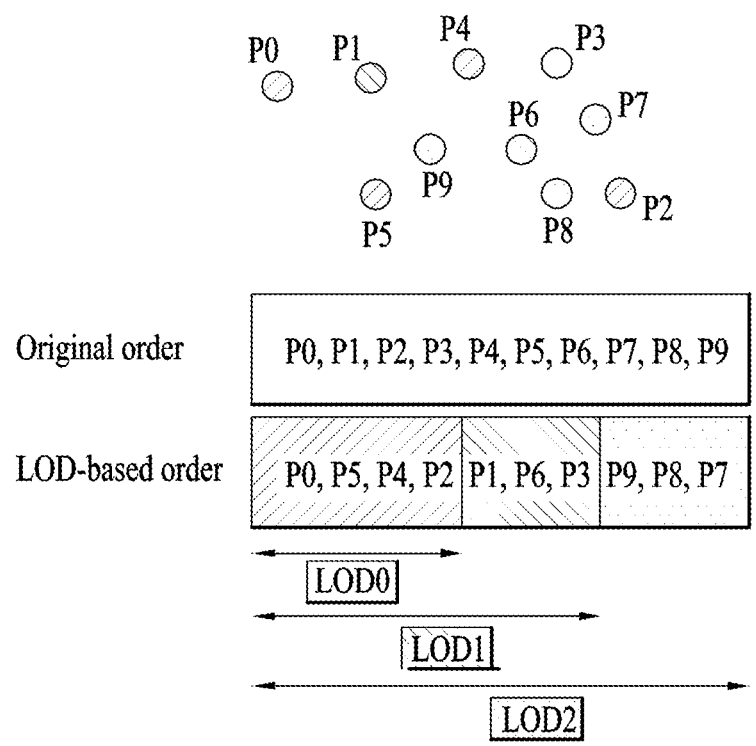
FIG. 9 illustrates an example of point configuration of point cloud content for each LOD according to embodiments.

FIG. 9 illustrates an example of point configuration of point cloud content for each LOD according to embodiments When a point cloud according to the embodiments is distributed, the original order represents, for example, the order of points P0 to P9.

According to embodiments, when the point cloud is separated for each LOD by LOD generation, for example, a group including P0, P5, P4, and P1 may belong to LOD0, and a group including P1, P6, and P3 may belong to LOD1. A group including P9, P8, and P7 may belong to LOD2. LOD-based order represents the order of the LOD groups.

Each point in the point cloud may be separated by LOD, and the configuration of points for each LOD includes points belonging to an LOD lower than each LOD value. For example, when the LOD is 2, it corresponds to all points belonging to LOD levels 1 and 2.

For prediction transform, a predictor is generated for each point in the point cloud. Accordingly, when there are N points, N predictors may be generated. The predictor may calculate and set a weight (=1/distance) based on the LOD value for each point, indexing information on neighbor points present within a distance set for each LOD, and distances from the neighbor points.

The values of an attribute (color or reflectance) of neighbor points set in the predictor of each point are multiplied by the weight calculated based on the distance of each neighbor point. The average of the color or reflectance values multiplied by the weights of the neighbor points is set as a predicted attribute value of the corresponding point. A quantization process is performed on a residual attribute value obtained by subtracting the predicted attribute value from the color or reflectance value of each point. The quantization process for the attributes is performed as follows.

TABLE

Attribute prediction residuals quantization pseudo code

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

TABLE

Attribute prediction residuals inverse quantization pseudo code

```
int PCCInverseQuantization(int value, int quantStep) {
    if( quantStep ==0) {
        return value;
    } else {
        return value * quantStep;
    }
}
```

When there are no neighbor points for the predictor of each point, entropy coding is performed directly on the color/reflectance value of the current point using the arithmetic coder. When there are neighbor points, quantization is performed on a residual attribute value obtained by subtracting an attribute value predicted through the neighbor points from the color or reflectance value of the point, and entropy coding is performed on the value obtained through the quantization using the arithmetic coder.

2.2.2.2 Lifting Transform According to Embodiments

The prediction transform and lifting transform processes reconstruct points into a set of detail levels through a level of detail (LOD) generation process. The reconstruction method has been described above.

Lifting transform generates a predictor for each point, sets a calculated LOD in the predictor, registers neighbor points, and sets weights according to the distances to the neighbor points. The difference from the prediction transform is that weights are cumulatively applied to the attribute values. The method is performed as follows:

1) A separate array Quantization Weight (QW) for storing the weight value for each point is present. The initial value of all elements of the QW is 1.0. Multiply the QW values of the predictor indexes of the neighbor nodes registered in the predictor by the weight of the predictor of the current point, and add the values obtained by the multiplication;

2) Subtract the value obtained by multiplying the attribute value of the point by the weight from the existing attribute value to calculate a predicted attribute value. This process is a lift prediction process;

3) Create temporary arrays called updateweight and update and initialize the same to zero;

4) Cumulatively add the weights calculated by multiplying the weights calculated for all predictors by a weight stored in the QW corresponding to a predictor index to the updateweight as indexes of neighbor nodes, and cumulatively add, to the update, a value obtained by multiplying the attribute value of the index of a neighbor node by the weight;

5) Divide the attribute values of the update array by the weight value of the updateweight array of the predictor index for all predictors, and add the existing attribute value to the values obtained by the division. This is the lift update process.

5) Quantize values obtained by additionally multiplying the attribute values updated through the lift update process by the weight updated through the lift prediction process (stored in the QW) for all predictors, and perform entropy coding on the quantized attribute values using the arithmetic coder.

2.2.2.3 RAHT Transform According to Embodiments

RAHT transform is a method of predicting attribute information of nodes at a higher level using attribute information associated with a node at a lower level of an octree. It is a method for intra-coding of attribute information through octree backward scan. Scanning is performed from a voxel to the entire region by combining the voxel into a larger block in each step up to the root node. The merging process is performed only on occupied nodes. Accordingly, for an empty node that is not occupied, merging is performed with the node of the next upper level.

Suppose that $g_{l_{x,y,z}}$ is the average attribute value of voxels at level l. $g_{l_{x,y,z}}$ may be calculated based on $g_{l+1_{2x,y,z}}$ and $g_{l+1_{2x+1,y,z}}$. When the weights for $g_{l_{2x,y,z}}$ and $g_{l_{2x+1,y,z}}$ are $w1=w_{l_{2x,y,z}}$ and $w2=w_{l_{2x+1,y,z}}$, an RAHT transform matrix may be obtained as follows.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix} \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

$g_{l-1_{x,y,z}}$ is a low-pass value and is used in the merging process at the next upper level. $h_{l-1_{x,y,z}}$ denotes high-pass coefficients. The high-pass coefficients at each step are quantized and coded through the arithmetic coder. The weights are calculated as $w_{l-1_{x,y,z}} = w_{l_{2x,y,z}} + w_{l_{2x+1,y,z}}$. The root node is generated through $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized like the high-pass coefficients and entropy coding is performed thereon at the end by the arithmetic coder.

Transmission Process According to Embodiments

The transmission process may be a process of processing and transmitting the encoded geometry and attribute data and metadata of the point cloud content that has undergone the encoding process. For transmission, processing according to any transmission protocol may be performed. Geometry and attribute data of the generated point cloud content, and related metadata bitstreams may be one or more track data, and a file therefor may be generated or the data may be encapsulated into segments. Data processed for transmission may be delivered over a broadcasting network and/or a broadband. These data may be delivered to the receiving side in an on-demand manner. The receiving side may receive the data through various paths. The encoded geometry and attribute data and metadata of the point cloud content that has gone through the encoding process may be stored in a digital storage medium in the form of a media file and transmitted to the receiving side.

Figure 10:
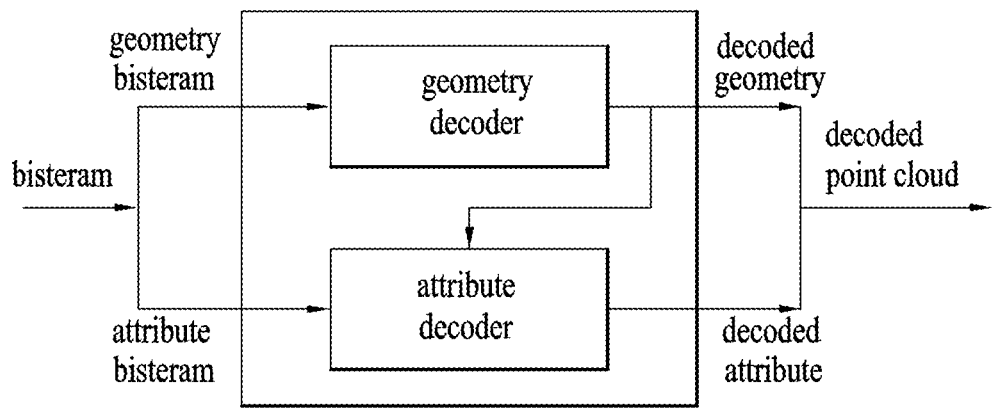
FIG. 10 illustrates an example block diagram of a point cloud decoder according to embodiments.

FIG. 10 illustrates an example block diagram of a point cloud decoder according to embodiments.

The point cloud decoder according to the embodiments receives a bitstream containing geometry and/or attributes for point cloud data. The geometry decoder according to the embodiments decodes the geometry, and the attribute decoder according to the embodiments decodes the attributes. The attribute decoder decodes the attributes based on the decoded geometry. The decoder may generate a point cloud based on the decoded geometry and/or decoded attributes.

4. Decoding Process According to Embodiments

The decoding process may include a process of receiving a bitstream and reconstructing (decoding) a point cloud video/image through an operation corresponding to the encoding operation.

Figure 11:
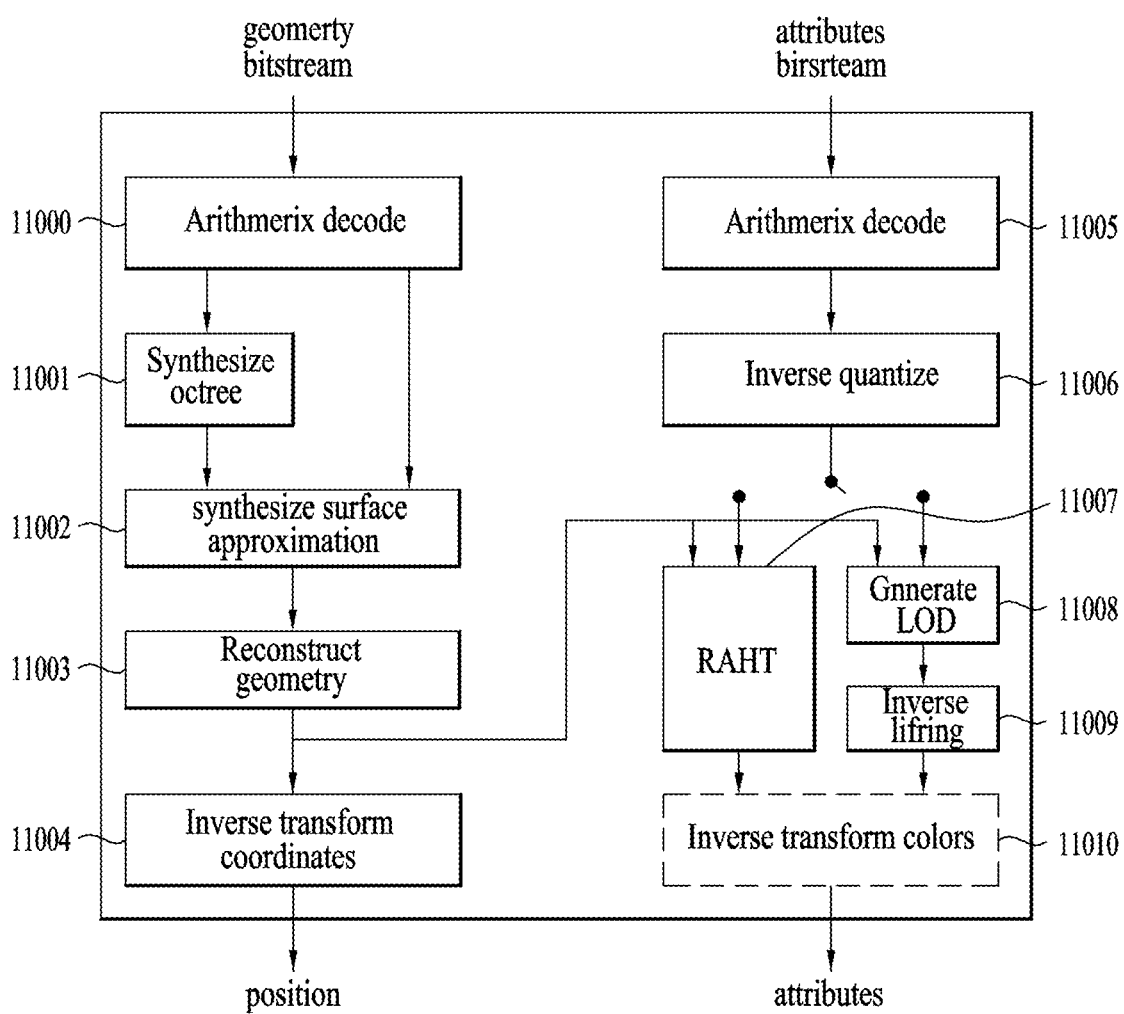
FIG. 11 illustrates an example of a point cloud decoder according to embodiments.

FIG. 11 illustrates an example of a point cloud decoder according to embodiments.

The point cloud decoder according to the embodiments may perform the reverse process of the point cloud encoder according to the embodiments.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, an RAHT 11007, an LOD generator (Generate LOD) 11008, an inverse lifter (Inverse lifting) 11009, and/or a color inverse transformer (Inverse transform colors) 11010.

The arithmetic decoder (Arithmetic decode) 11000 according to the embodiments decodes geometry contained in the received bitstream based on an arithmetic method.

The octree synthesizer (Synthesize octree) 11001 according to the embodiments may generate an octree from the geometry.

The surface approximation synthesizer (Synthesize surface approximation) 11002 according to the embodiments may synthesize a surface based on the decoded geometry and/or the octree.

The geometry reconstructor (Reconstruct geometry) 11003 according to the embodiments may regenerate geometry based on the surface and/or the decoded geometry.

The coordinate inverse transformer (Inverse transform coordinates) 11004 according to the embodiments may acquire positions by inversely transforming the coordinates based on the geometry.

The arithmetic decoder (Arithmetic decode) 11005 according to the embodiments decodes an attribute contained in the received bitstream based on an arithmetic method.

The inverse quantizer (Inverse quantize) 11006 according to the embodiments performs inverse quantization on the decoded attribute.

The RAHT 11007, the LOD generator (Generate LOD) 11008, and/or the inverse lifter (Inverse lifting) 11009 may perform a reverse process of the corresponding operation of the encoder according to the embodiments.

The color inverse transformer (Inverse transform colors) 11010 may acquire an attribute (e.g., a color value) by inversely transforming a color.

The decoding process may include a geometry decoding process and an attribute decoding process. The decoder may reconstruct (decode) geometry from the geometry bitstream included in the input bitstream, and reconstruct (decode) attributes based on the attribute bitstream included in the input bitstream and the reconstructed geometry. A 3D point cloud video/image may be reconstructed based on the position information according to the reconstructed geometry and the (color) texture attribute according to the decoded attributes.

Specifically, the decoder acquires geometry information by decoding the geometry bitstream with the arithmetic coder, generates an octree through the occupancy code acquired based on the geometry information, and reconstructs the geometry. When the direct mode is applied, the location information value of the point is directly retrieved and added. When the trisoup mode is applied, the geometry is reconstructed through triangle reconstruction, up-sampling, and voxelization (For details, see Section 2.1.3). The reconstructed geometry may include a reconstructed (decoded) point cloud picture/frame without (any) attributes.

In addition, the decoder may acquire information on the attributes by decoding the received attribute bitstream with the arithmetic coder, and generate a reconstructed (decoded) point cloud picture/frame with attributes based on the acquired information on the attributes and the associated location information derived in the geometry coding process. In the attribute decoding process, when necessary, an inverse quantization process may be performed, and an inverse transform process for prediction/lifting/RAHT may be optionally performed according to a method applied in encoding. Then, when necessary, color transform may be performed to reconstruct the attributes.

5. Rendering Process According to Embodiments

The rendering process refers to the process of rendering and displaying point cloud content data in 3D space. Rendering may be performed according to a desired rendering scheme based on the location and attribute information about the points decoded through the decoding process. The points of the point cloud content may be rendered as a vertex with a certain thickness, a cube with a specific minimum size centered on the vertex position, or a circle centered on the vertex position. The user may view all or part of the rendered result through a VR/AR display or a general display.

6. Feedback Process According to Embodiments

The feedback process may include a process of transferring various kinds of feedback information that may be acquired in the display process to the transmitting side or the receiving side decoding. Through the feedback process, interactivity may be provided in point cloud video consumption. According to an embodiment, in the feedback process, head orientation information, viewport information indicating a region currently viewed by a user, and the like may be delivered to the transmitting side. According to an embodiment, the user may interact with things implemented in the VR/AR/MR/autonomous driving environment. In this case, information related to the interaction may be delivered to the transmitting side or a service provider during the feedback process. According to an embodiment, the feedback process may be skipped.

The head orientation information may represent information about the location, angle and motion of a user's head. On the basis of this information, information about a region of the point cloud video currently viewed by the user, that is, viewport information, may be calculated.

The viewport information may be information about a region of the point cloud video currently viewed by the user. Gaze analysis may be performed based on the viewport information to check the way the user consumes the point cloud video, a region of the point cloud video at which the user gazes, and how long the user gazes at the region. The gaze analysis may be performed at the receiving side and the result of the analysis may be delivered to the transmitting side on a feedback channel. A device such as a VR/AR/MR display may extract a viewport region based on the location/orientation of the user's head, vertical or horizontal FOV supported by the device, and the like.

According to an embodiment, the aforementioned feedback information may not only be delivered to the transmitting side, but also be consumed at the receiving side. That is, decoding and rendering processes at the receiving side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently being viewed by the user. A viewpoint is a point which is viewed by the user in the point cloud video and may represent a center point of the viewport region. That is, a viewport is a region around a viewpoint, and the size and form of the region may be determined by the field of view (FOV).

Figure 12:
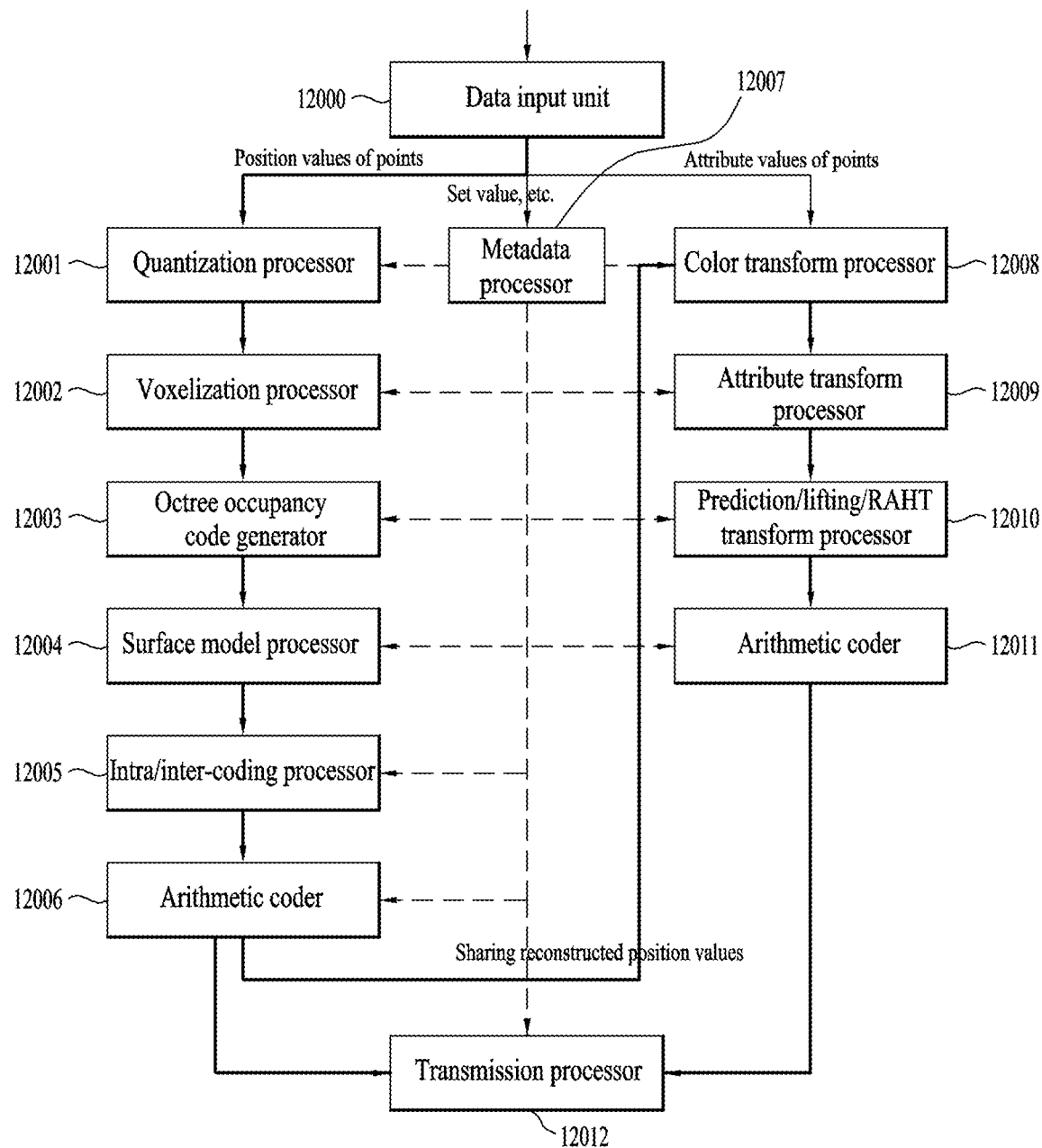
FIG. 12 illustrates components of a transmitter for point cloud video encoding according to embodiments.

FIG. 12 illustrates components of a transmitter for point cloud video encoding according to embodiments.

Components for video encoding of point cloud data according to embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may correspond to the point cloud video acquirer 10001 of FIG. 1 according to the embodiments.

The quantization processor 12001 quantizes geometry of the point cloud data, for example, information of position values of points.

The voxelization processor 12002 voxelizes the quantized position value information about of the points.

The octree occupancy code generator 12003 represent the voxelized position value information about the points as an octree based on the octree occupancy code.

The surface model processor 12004 may express and process an octree for position value information about points of a point cloud based on a surface model method.

The intra/inter-coding processor 12005 may perform intra/inter-coding on the point cloud data.

The arithmetic coder 12006 may encode the point cloud data based on an arithmetic coding scheme.

The metadata processor 12007 processes metadata about the point cloud data, for example, a set value, and provides the same to a necessary process such as the geometry encoding process and/or the attribute encoding process.

The color transform processor 12008 may transform the color of the point cloud data based on the attribute of the point cloud data, for example, attribute value information about the points and/or the reconstructed position values.

The attribute transform processor 12009 may transform the attribute values of the point cloud data The prediction/lifting/RAHT conversion transform processor 12010 may perform attribute coding on the point cloud data based on a combination of the prediction method, the lifting method, and/or the RAHT method.

The arithmetic coder 12011 may encode the point cloud data based on the arithmetic coding.

The above processes may correspond to the point cloud encoder 10002 of FIG. 1 according to embodiments.

The transmission processor 12012 may transmit the encoded geometry and/or the encoded attributes.

According to embodiments, a process for the position values of points and a process for attribute values of the points may share data/information to perform each operation.

FIG. 12 is a diagram showing a transmitter for providing a point cloud content service according to embodiments.

The embodiments at the transmitting side may be related to the point cloud content transmission device. The point cloud content transmission device transmits a geometry bitstream and an attribute bitstream, which are encoded through a data input unit, a quantization processor, a voxelization processor, an octree occupancy code generator for point position values, a surface model processor, an intra/inter-coding processor, an arithmetic coder, a metadata processor, a color transform processor, an attribute transform processor for processing attribute values for point position/voxel values based on the reconstructed position values, a prediction transform processor, a lifting transform processor, an RAHT transform processor, and an arithmetic coder operated according to the attribute encoding scheme used, to the receiving side through the transmission processor. The function of each component is described in the encoding process in Section 2 and the transmission process in Section 3.

Figure 13:
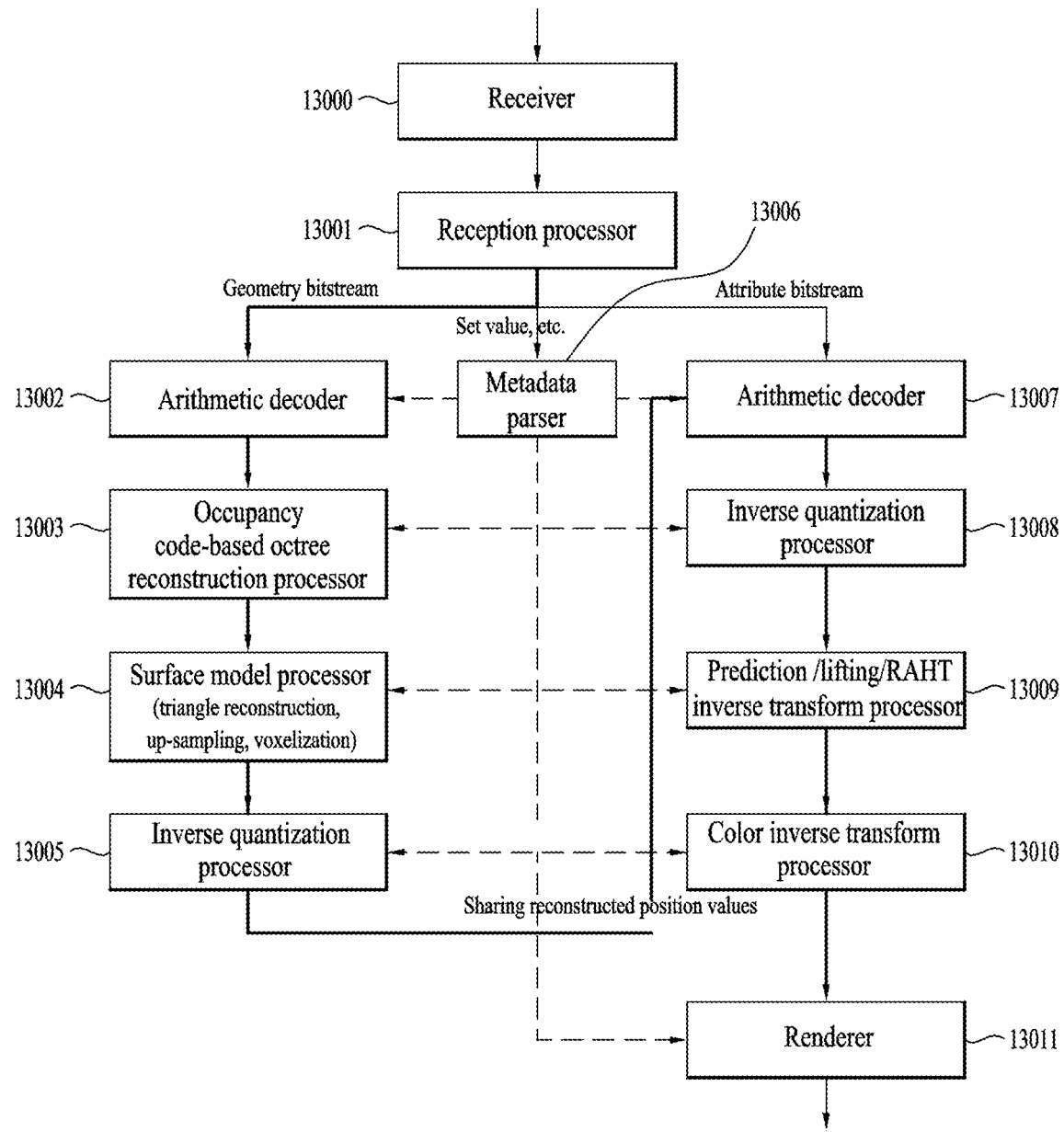
FIG. 13 illustrates components of a receiver for point cloud video decoding according to embodiments.

FIG. 13 illustrates components of a receiver for point cloud video decoding according to embodiments.

Components for video decoding of point cloud data according to embodiments may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each component for decoding according to the embodiments may perform an inverse process of the operation of a corresponding component for encoding according to the embodiments.

The receiver 13000 receives point cloud data. The receiver 13000 may correspond to the receiver 10005 of FIG. 1.

The reception processor 13001 may acquire a geometry bitstream and/or an attribute bitstream contained in the received point cloud data.

The arithmetic decoder 13002 may decode the geometry bitstream based on arithmetic coding.

The occupancy code-based octree reconstruction processor 13003 may reconstruct an octree from the decoded geometry based on an occupancy code.

The surface model processor (triangle reconstruction, up-sampling, voxelization) 13004 may perform processing according to triangular reconstruction, up-sampling, voxelization, and/or a combination thereof for the point cloud data based on the surface model scheme.

The inverse quantization processor 13005 may inversely quantize the point cloud data.

The metadata parser 13006 may parse metadata contained in the received point cloud data, for example, a set value. The metadata parser 13006 may pass the metadata to each operation of the geometry decoding process and/or the attribute decoding process. Each process according to the embodiments may be performed based on necessary metadata.

The arithmetic decoder 13007 may decode the attribute bitstream of the point cloud data by arithmetic coding based on the reconstructed position values The inverse quantization processor 13008 may inversely quantize the point cloud data.

The prediction/lifting/RAHT inverse transformer 13009 may process the point cloud data based on the prediction/lifting/RAHT scheme and/or a scheme according to a combination thereof.

The color inverse transform processor 13010 may inversely transform the color values of the point cloud data.

The above-described processes may correspond to the point cloud decoder 10006 of FIG. 1 according to the embodiments.

The renderer 13011 may render the point cloud data.

The figure shows receiver equipment for providing a point cloud content service according to embodiments.

The embodiments at the receiving side may be related to the point cloud content reception device. The point cloud content reception device deliver the data to the renderer through a color inverse transform processor via a receiver, a reception processor, a metadata parser, an arithmetic decoder for a geometry bitstream of points, an occupancy code-based octree reconstruction processor, a surface model processor, an inverse quantization processor, an arithmetic decoder for decoding attribute values for the point positions/voxel values based on the reconstructed position value, an inverse quantization processor, an prediction inverse transform processor according to the attribute encoding scheme used, a lifting inverse transform processor, and an RAHT inverse transform processor, and rendered to provide users with experiences such as VR/AR/MR/autonomous driving. The functions of the respective components are described in the transmission process in Section 3, the decoding process in Section 4, and the rendering process in Section 5.

In the entire architecture for providing point cloud video described above, point cloud data that undergoes a series of processes of acquisition/encoding/transmission/decoding/rendering may be referred to as point cloud content data or point cloud video data. The term point cloud content data may also be used as a concept including metadata or signaling information related to these point cloud data.

Figure 14:
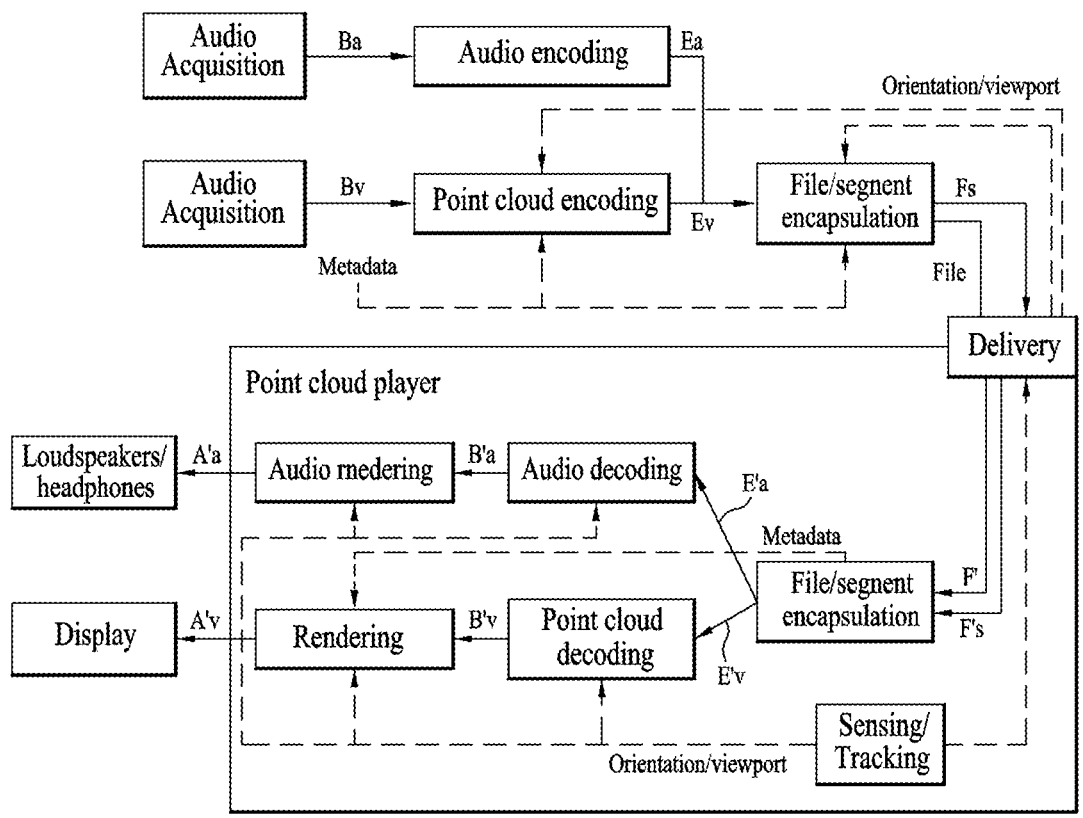
FIG. 14 illustrates an architecture for storing and streaming G-PCC-based point cloud data according to embodiments.

FIG. 14 illustrates an architecture for storing and streaming G-PCC-based point cloud data according to embodiments.

Embodiments provide a method for storing and streaming point cloud data that supports various services such as virtual reality (VR), augmented reality (AR), mixed reality (MR), and autonomous driving for the user.

FIG. 14 shows the overall architecture for storing or streaming point cloud data compressed based on video-based point cloud compression (V-PCC). The process of storing and streaming the point cloud data may include an acquisition process, an encoding process, a transmission process, a decoding process, a rendering process, and/or a feedback process.

The embodiments propose a method of effectively providing point cloud media/content/data. In order to effectively provide point cloud media/content/data, a point cloud may be acquired first. For example, point cloud data may be acquired by one or more cameras through capture, synthesis or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like containing the point cloud data may be generated. For point cloud data having multiple frames, one or more files may be acquired. In this process, point cloud related metadata (e.g., metadata related to capture, etc.) may be generated.

The point cloud encoder may perform a geometry-based point cloud compression (G-PCC) procedure, which includes a series of procedures such as prediction, transformation, quantization, and entropy coding, and the encoded data (encoded video/image information) may be output in the form of a bitstream. The data may be encoded by dividing the same into geometry and attributes as will described later, and point cloud related metadata may be contained in the bitstream. In this case, the output bitstream may include a geometry bitstream and/or an attribute bitstream.

The encapsulation (file/segment encapsulation) may encapsulate the encoded point cloud data and/or point cloud related metadata in the form of a file or a segment for streaming. Here, the point cloud related metadata may be received from a metadata processor. The metadata processor may be included in the point cloud video encoder, or may be configured as a separate component/module. The encapsulation processor may encapsulate the data in a file format such as ISOBMFF, or may process the data in the form of other DASH segments. The encapsulation processor may include point cloud related metadata in a file format according to an embodiment. The point cloud metadata may be included in, for example, boxes of various levels in the ISOBMFF file format, or may be included as data in separate tracks in the file. According to an embodiment, the encapsulation processor may encapsulate the point cloud related metadata as a file.

A transmission processor may perform processing of the encapsulated point cloud data for transmission according to the file format. The transmission processor may be included in the transmitter or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver of the reception device over a digital storage medium or a network. For transmission, processing according to any transmission protocol may be performed. The data processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the embodiments. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor may perform processing on the received point cloud data according to the transmission protocol. The reception processor may be included in the receiver or may be configured as a separate component/module. The reception processor may perform a reverse process of the process of the transmission processor described above so as to correspond to the processing for transmission performed at the transmission side. The reception processor may deliver the acquired point cloud data to a decapsulation processor, and the acquired point cloud-related metadata to a metadata parser.

A decapsulation processor (file/segment decapsulation) may decapsulate the point cloud data received in the form of a file from the reception processor. The decapsulation processor may decapsulate files according to ISOBMFF or the like, and may acquire a point cloud bitstream or point cloud-related metadata (or a separate metadata bitstream). The acquired point cloud bitstream may be delivered to the point cloud decoder, and the acquired point cloud video-related metadata (metadata bitstream) may be delivered to the metadata processor. The point cloud bitstream may include the metadata (metadata bitstream). The metadata processor may be included in the point cloud decoder or may be configured as a separate component/module. The point cloud video-related metadata acquired by the decapsulation processor may take the form of a box or track in the file format. The decapsulation processor may receive metadata necessary for decapsulation from the metadata processor, when necessary. The point cloud-related metadata may be delivered to the point cloud decoder and used in a point cloud decoding procedure, or may be transferred to the renderer and used in a point cloud rendering procedure.

The point cloud decoder may receive the bitstream and decode the data by performing an operation corresponding to the operation of the point cloud encoder. In this case, the point cloud decoder may decode the point cloud data by dividing the same into geometry and attributes as described below. For example, the point cloud decoder may reconstruct (decode) geometry from the geometry bitstream included in the input bitstream, and reconstruct (decode) attribute values based on the attribute bitstream included in the input bitstream and the reconstructed geometry. A point cloud may be reconstructed by reconstructing the 3D position of each point and attribute information about each point based on the position information according to the reconstructed geometry and the (color) texture attribute according to the decoded attribute values.

A sensor/tracker (sensing/tracking) acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the region currently viewed by the user in a 3D space, that is, user viewport information may be calculated.

The user viewport information may be information about an area in a 3D space currently viewed by the user through a device or an HMD. A device such as a display may extract a viewport region based on the orientation information, a vertical or horizontal FOV supported by the device, and the like. The orientation or viewport information may be extracted or calculated at the receiving side. The orientation or viewport information analyzed at the receiving side may be transmitted to the transmission side on a feedback channel.

Based on the orientation information acquired by the sensor/tracker and/or the viewport information indicating the region currently viewed by the user, the receiver may efficiently extract or decode only media data of a specific region, i.e., the region indicated by the orientation information and/or the viewport information from the file. In addition, based on the orientation information and/or viewport information acquired by the sensor/tracker, the transmitter may efficiently encode only the media data of the specific region, that is, the region indicated by the orientation information and/or the viewport information, or generate and transmit a file therefor.

The renderer may render the decoded point cloud data in a 3D space. The rendered video/image may be displayed through the display. The user may view all or part of the rendered result through a VR/AR display or a typical display.

The feedback process may include transferring various kinds of feedback information that may be acquired in the rendering/displaying process to the transmitting side or the decoder of the receiving side. Through the feedback process, interactivity may be provided in consumption of point cloud data. According to an embodiment, head orientation information, viewport information indicating an region currently viewed by a user, and the like may be delivered to the transmitting side in the feedback process. According to an embodiment, the user may interact with what is implemented in the VR/AR/MR/self-driving environment. In this case, information related to the interaction may be delivered to the transmitting side or a service provider in the feedback process. According to an embodiment, the feedback process may be skipped.

According to an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the region currently viewed by the user may be preferentially decapsulated, decoded, and rendered based on the orientation information and/or the viewport information.

Figure 15:
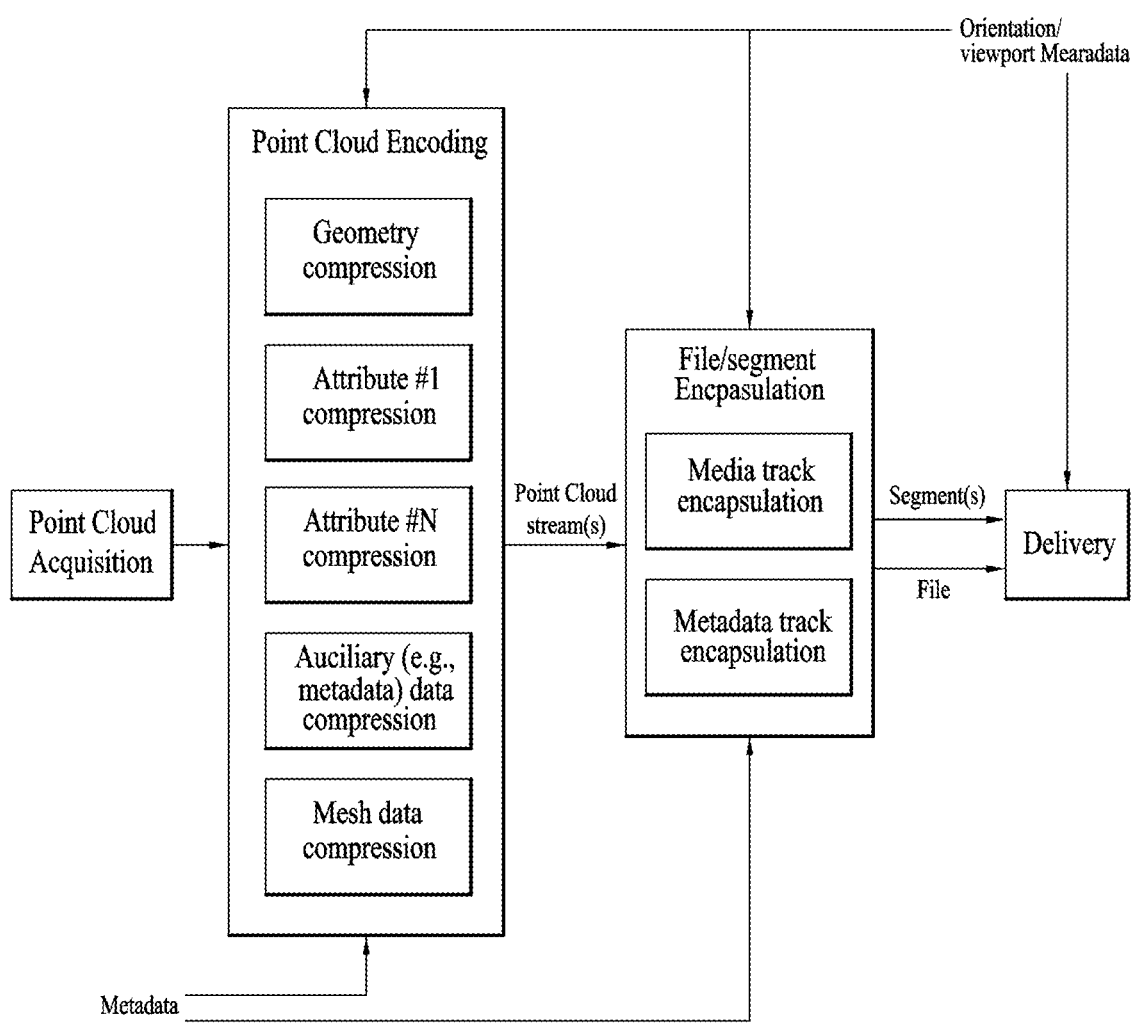
FIG. 15 illustrates an example of storage and transmission of point cloud data according to embodiments.

FIG. 15 illustrates an example of storage and transmission of point cloud data according to embodiments.

The figure shows a point cloud data transmission device according to embodiments.

The point cloud data storage and transmission device according to the embodiments includes a point cloud acquirer (Point Cloud Acquisition), a point cloud encoder (Point Cloud Encoding), a file/segment encapsulator (File/Segment Encapsulation), and/or a deliverer (Delivery). Each component of the transmission device may be a module/unit/component/hardware/software/a processor.

The geometry, attribute, auxiliary data, and mesh data of the point cloud may each be configured as a separate stream or stored in different tracks in a file. Furthermore, they may be included in a separate segment.

A point cloud acquirer (point cloud acquisition) 21000 acquires a point cloud. For example, one or more cameras may acquire point cloud data through capture, composition or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like including the point cloud data may be generated. For point cloud data having multiple frames, one or more files may be acquired. In this process, point cloud related metadata (e.g., metadata related to capture, etc.) may be generated.

In the point cloud encoding, the point cloud encoder performs a geometry-based point cloud compression (G-PCC) procedure, which includes a series of procedures such as prediction, transformation, quantization, and entropy coding, and the encoded data (the encoded video/image information) may be output in the form of a bitstream. The data may be encoded by dividing the same into geometry and attributes as will be described later, and point cloud related metadata may be contained in the bitstream. In this case, the output bitstream may include a geometry bitstream and/or an attribute bitstream. The point cloud encoder may receive metadata. The metadata represents metadata related to content for a point cloud. For example, there may be initial viewing orientation metadata. The metadata indicates whether the point cloud data is data representing the front or data representing the back. The point cloud encoder may receive orientation information and/or viewport information. The point cloud encoder may perform encoding based on the metadata, orientation information, and/or viewport information.

Specifically, the point cloud encoder (Point Cloud Encoding) performs geometry compression, attribute compression, auxiliary data compression, and mesh data compression.

The geometry compression encodes point cloud geometry information. Geometry represents a point in 3D space.

The attribute compression encodes the attributes of the point cloud. The attributes represent one or more attributes. For example, there may be N attributes including an attribute such as color or reflectance.

The auxiliary data compression encodes auxiliary data associated with the point cloud. The auxiliary data represents metadata about the point cloud.

The mesh data compression encodes mesh data. Mesh represents information about connection between point clouds. For example, it may be triangular data.

The point cloud encoder encodes the geometry, attributes, auxiliary data, and mesh data of points, which are information necessary for rendering of the points. The point cloud encoder may encode the geometry, attributes, auxiliary data, and mesh data and deliver the same in one bitstream. Alternatively, the point cloud encoder may encode the geometry, attributes, auxiliary data, and mesh data and transmit the same in a plurality of bitstreams. Operations of the point cloud encoder may be performed in parallel.

The file/segment encapsulator (File/Segment Encapsulation) performs media track encapsulation and/or metadata track encapsulation. The file/segment encapsulator creates tracks to deliver the encoded geometry, encoded attributes, encoded auxiliary data, and encoded mesh data in a file format. A bitstream containing the encoded geometry, a bitstream containing the encoded attributes, a bitstream containing the encoded auxiliary data, and a bitstream containing the encoded mesh data may be included in one or more tracks. The file/segment encapsulator encapsulates the geometry, attributes, auxiliary data, and mesh data into one or more media tracks. In addition, the file/segment encapsulator includes the metadata in a media track or encapsulates the metadata in a separate metadata track. The file/segment encapsulator encapsulates the point cloud stream(s) in the form of a file and/or a segment. When the point cloud stream(s) is encapsulated and delivered in the form of segment(s), it is delivered in the DASH format. When the file/segment encapsulator encapsulates the point cloud stream(s) in the form of a file, it delivers a file.

The deliverer (Delivery) may deliver a point cloud bitstream or a file/segment including the bitstream to the receiver of the reception device over a digital storage medium or a network. Processing according to any transmission protocol may be performed for transmission. The data that has been processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD. The deliverer may include an element for generating a media file in a predetermined file format, and may include an element for transmission over a broadcast/communication network. The deliverer receives orientation information and/or viewport information from the receiver. The deliverer may deliver the acquired orientation information and/or viewport information (or information selected by the user) to the file/segment encapsulator and/or the point cloud encoder. Based on the orientation information and/or the viewport information, the point cloud encoder may encode all point cloud data or the point cloud data indicated by the orientation information and/or the viewport information. Based on the orientation information and/or the viewport information, the file/segment encapsulator may encapsulate all point cloud data or the point cloud data indicated by the orientation information and/or the viewport information. Based on the orientation information and/or the viewport information, the deliverer may deliver all point cloud data or the point cloud data indicated by the orientation information and/or the viewport information.

Figure 16:
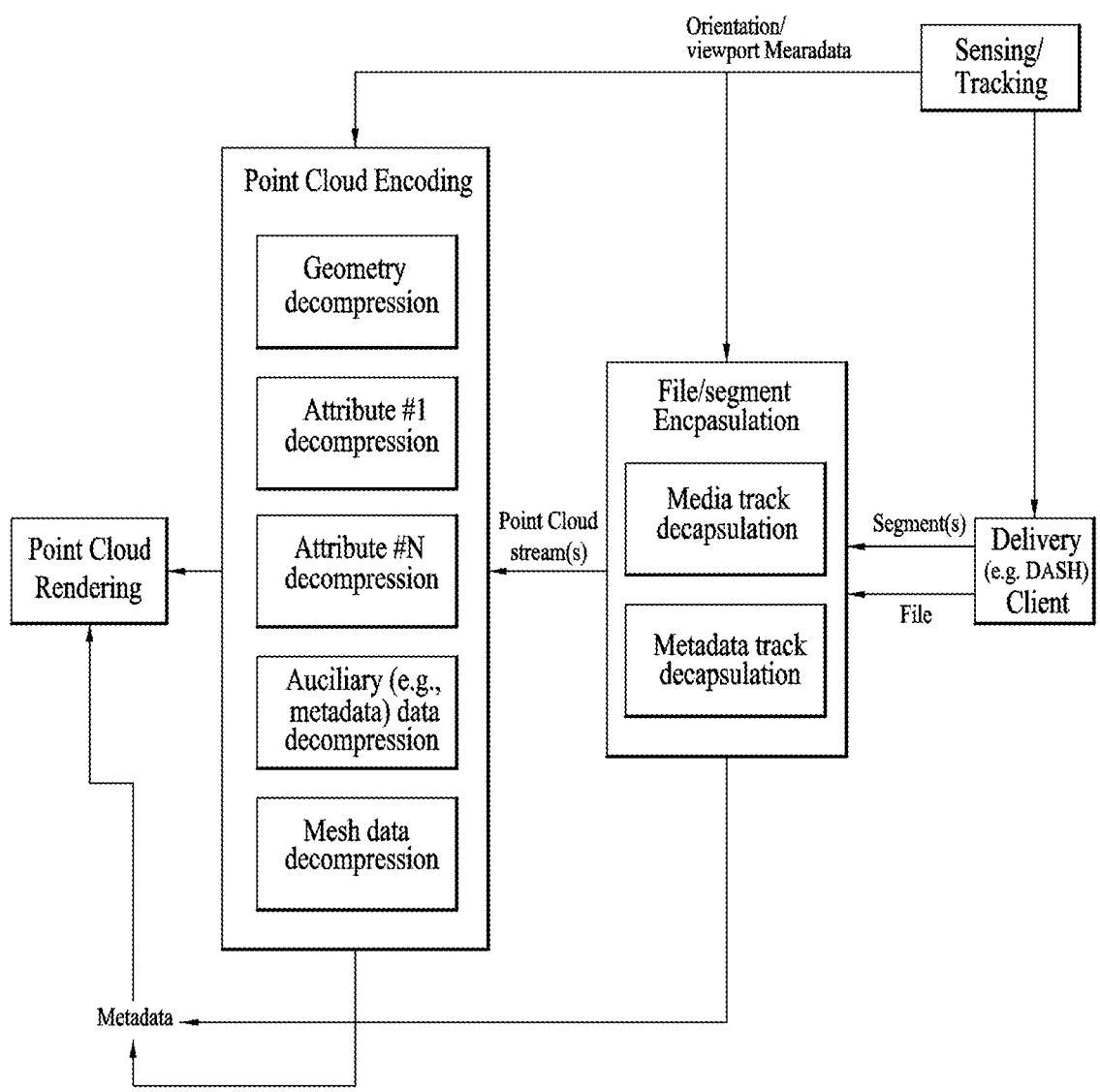
FIG. 16 illustrates a point cloud reception device according to embodiments.

FIG. 16 illustrates a point cloud reception device according to embodiments.

The figure shows a point cloud data reception device.

The point cloud data reception device according to the embodiments includes a delivery client, a sensor/tracker (Sensing/Tracking), a file/segment decapsulator (File/Segment decapsulation), and a point cloud decoder, and/or a point cloud renderer (Point Cloud Rendering), and a display. Each component of the reception device may be a module/unit/component/hardware/software/processor, or the like.

The delivery client may receive point cloud data, a point cloud bitstream, or a file/segment including the bitstream transmitted by the point cloud data transmission device according to the embodiments. The receiver may receive the point cloud data over a broadcast network or through a broadband depending on the channel used for the transmission. Alternatively, it may receive the point cloud video data through a digital storage medium. The receiver may include a process of decoding the received data and rendering the received data according to the user viewport. The reception processor may perform processing on the received point cloud data according to a transmission protocol. A reception processor may be included in the receiver or configured as a separate component/module. The reception processor may reversely perform the process of the transmission processor described above so as to correspond to the processing for transmission performed at the transmitting side. The reception processor may deliver the acquired point cloud data to the decapsulation processor and the acquired point cloud related metadata to the metadata parser.

The sensor/tracker (Sensing/Tracking) acquires orientation information and/or viewport information. The sensor/tracker may deliver the acquired orientation information and/or viewport information to the delivery client, the file/segment decapsulator, and the point cloud decoder.

The delivery client may receive all point cloud data or the point cloud data indicated by the orientation information and/or the viewport information based on the orientation information and/or the viewport information. The file/segment decapsulator may decapsulate all point cloud data or the point cloud data indicated by the orientation information and/or the viewport information based on the orientation information and/or the viewport information. The point cloud decoder may decode all point cloud data or the point cloud data indicated by the orientation information and/or the viewport information based on the orientation information and/or the viewport information.

The file/segment decapsulator (File/Segment Decapsulation) performs media track decapsulation and/or metadata decapsulation. The decapsulation processor (file/segment decapsulation) may decapsulate the point cloud data in the form of a file received from the reception processor. The decapsulation processor (file/segment decapsulation) may decapsulate files or segments according to ISOBMFF, etc., to acquire a point cloud bitstream or point cloud-related metadata (or a separate metadata bitstream). The acquired point cloud bitstream may be delivered to the point cloud decoder, and the acquired point cloud-related metadata (or metadata bitstream) may be delivered to the metadata processor. The point cloud bitstream may include the metadata (metadata bitstream). The metadata processor may be included in the point cloud video decoder or may be configured as a separate component/module. The point cloud-related metadata acquired by the decapsulation processor may take the form of a box or track in a file format. The decapsulation processor may receive metadata necessary for decapsulation from the metadata processor, when necessary. The point cloud-related metadata may be delivered to the point cloud decoder and used in a point cloud decoding procedure, or may be delivered to the renderer and used in a point cloud rendering procedure.

The point cloud decoder (Point Cloud Decoding) performs geometry decompression, attribute decompression, auxiliary data decompression, and/or mesh data decompression. The point cloud decoder may receive the bitstream and perform an operation corresponding to the operation of the point cloud encoder to decode the data. In this case, the point cloud decoder can decode the point cloud data by dividing the same into geometry and attributes, as will be described later. For example, the point cloud decoder can reconstruct (decode) geometry from the geometry bitstream included in the input bitstream, and reconstruct attribute values based on the attribute bitstream included in the input bitstream and the reconstructed geometry. The mesh may be reconstructed (decoded) based on the mesh bitstream included in the input bitstream and the reconstructed geometry. The point cloud can be reconstructed by restoring the position of each point in 3D and the attribute information about each point based on position information according to the reconstructed geometry and a (color) texture attribute according to the decoded attribute value. Operations of the point cloud decoding unit may be performed in parallel.

The geometry decompression decodes geometry data from the point cloud stream(s). The attribute decompression decodes attribute data from the point cloud stream(s). The auxiliary data decompression decodes the auxiliary data from the point cloud stream(s). The mesh data decompression decodes the mesh data from the point cloud stream(s).

The point cloud renderer (Point Cloud Rendering) reconstructs the position of each point in the point cloud and the attributes of the point based on the decoded geometry, attributes, auxiliary data, and mesh data, and renders the point cloud data. The point cloud renderer generates and renders mesh (connection) data between point clouds based on the reconstructed geometry, reconstructed attributes, reconstructed auxiliary data, and/or reconstructed mesh data. The point cloud renderer receives metadata from the file/segment encapsulator and/or the point cloud decoding unit. The point cloud renderer may render the point cloud data based on the metadata according to the orientation or viewport.

The display actually displays the result of rendering on the display.

Figure 17:
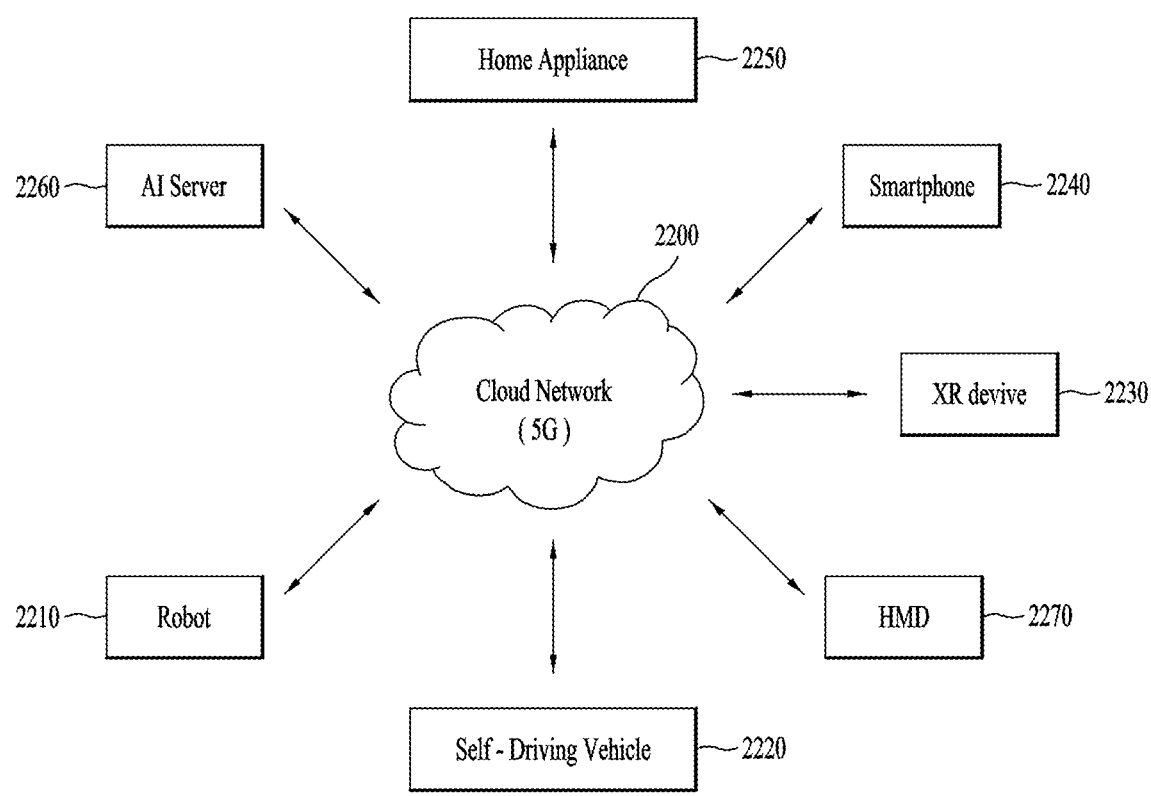
FIG. 17 illustrates an example structure operatively connectable with a method/device for transmitting and receiving point cloud data according to embodiments.

FIG. 17 illustrates an example structure operatively connectable with a method/device for transmitting and receiving point cloud data according to embodiments.

Referring to FIG. 17, in the structure according to the embodiments, at least one of a server 1760, a robot 1710, a self-driving vehicle 1720, an XR device 1730, a smartphone 1740, a home appliance 1750 and/or a head-mount display (HMD) 1770 is connected to a cloud network 1700. Here, the robot 1710, the self-driving vehicle 1720, the XR device 1730, the smartphone 1740, or the home appliance 1750 may be referred to as a device. In addition, the XR device 1730 may correspond to a point cloud data (PCC) device according to embodiments or may be operatively connected to the PCC device.

The cloud network 1700 may represent a network that constitutes part of the cloud computing infrastructure or is present in the cloud computing infrastructure. Here, the cloud network 1700 may be configured using a 3G network, 4G or Long Term Evolution (LTE) network, or a 5G network.

The server 1760 may be connected to at least one of the robot 1710, the self-driving vehicle 1720, the XR device 1730, the smartphone 1740, the home appliance 1750, and/or the HMD 1770 over the cloud network 1700 and may assist at least a part of the processing of the connected devices 1710 to 1770.

The HMD 1770 represents one of the implementation types of the XR device and/or the PCC device according to the embodiments. According to embodiments, an HMD device includes a communication unit, a control unit, a memory, an I/O unit, a sensor unit, and a power supply unit.

Hereinafter, various embodiments of the devices 1710 to 1750 to which the above-described technology is applied will be described. The devices 1710 to 1750 illustrated in FIG. 17 may be operatively connected/coupled to a point cloud data transmission and reception device according to the above-described embodiments.

<PCC+XR>

The XR/PCC device 1730 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1730 may analyze 3D point cloud data or image data acquired through various sensors or from an external device and generate position data and attribute data about 3D points. Thereby, the XR/PCC device 1730 may acquire information about the surrounding space or a real object, and render and output an XR object. For example, the XR/PCC device 1730 may match an XR object including auxiliary information about a recognized object with the recognized object and output the matched XR object.

<PCC+Self-Driving+XR>

The self-driving vehicle 1720 may be implemented as a mobile robot, a vehicle, an unmanned aerial vehicle, or the like by applying the PCC technology and the XR technology.

The self-driving vehicle 1720 to which the XR/PCC technology is applied may represent an autonomous vehicle provided with means for providing an XR image, or an autonomous vehicle that is a target of control/interaction in the XR image. In particular, the self-driving vehicle 1720, which is a target of control/interaction in the XR image, may be distinguished from the XR device 1730 and may be operatively connected thereto.

The self-driving vehicle 1720 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device according to the embodiments may be applied to a vehicle that provides a self-driving service.

A vehicle that provides the self-driving service is connected to a PCC device for wired/wireless communication.

When the point cloud data transmission and reception device (PCC device) according to the embodiments is connected to a vehicle for wired/wireless communication, the device may receive and process content data related to an AR/VR/PCC service that may be provided together with the self-driving service and transmit the processed content data to the vehicle. In the case where the point cloud data transmission and reception device is mounted on a vehicle, the point cloud transmitting and reception device may receive and process content data related to the AR/VR/PCC service according to a user input signal input through a user interface device and provide the processed content data to the user. The vehicle or the user interface device according to the embodiments may receive a user input signal. The user input signal according to the embodiments may include a signal indicating the self-driving service.

In the present disclosure, a method/device according to embodiments refers to a method/device for transmitting point cloud data and/or a method/device for receiving point cloud data according to the embodiments. In addition, the point cloud data transmission device according to the embodiments refers to a PCC encoding device and/or encoder, and the point cloud data reception device according to the embodiments refers to a PCC decoding device and/or decoder.

The point cloud data according to the embodiments may be referred to as a point cloud or point cloud content, and the geometry information according to the embodiments may be referred to as geometry information. The attribute information according to the embodiments may be referred to as attribute information.

The method/device according to the embodiments provides a method for applying geometry and attribute quantization of G-PCC for compression of 3D point cloud data.

The method/device according to the embodiments provides a method for applying/adjusting region-wise adaptive quantization according to a characteristic of content and a characteristic of a service in relation to a point cloud.

In addition, the method/device according to the embodiments may divide data into regions smaller than slices according to the degree of distribution of the content in the G-PCC geometry/attribute encoding/decoding process, allocate geometry/attribute QP for adjustment of the compression quality of the divided regions according to the type of a service, set whether to merge overlapping points, modify/apply the geometry coding method based on the setting, and apply an overlap processing method in constructing an octree to provide a region-wise adaptive quantization control/application scheme.

Accordingly, the method/device according to the embodiments may apply a secondary geometry quantization operation, construct a divided region-based octree, and provide an efficient signaling scheme therefor.

The present disclosure relates to a method of adjusting the geometry and attribute compression quality of G-PCC for compression of 3D point cloud data according to distribution of the point cloud.

Hereinafter, an encoder and an encoding device will be referred to as an encoder, and a decoder and a decoding device will be referred to as a decoder.

According to embodiments, a point cloud may be composed of a set of points, and each of the points may include geometry information and attribute information. The geometry information is three-dimensional position (XYZ) information, and the attribute information is a value of color (RGB, YUV, etc.) and/or reflectance.

According to embodiments, a G-PCC encoding process may include compressing geometry and compressing attribute information based on the geometry reconstructed with position information changed through compression (reconstructed geometry=decoded geometry).

According to embodiments, a G-PCC decoding process may include receiving an encoded geometry bitstream and attribute bitstream, decoding geometry, and decoding attribute information based on the geometry reconstructed through the decoding process (For detail, refer to the description with reference to FIG. 1 and the like).

In the process of compressing geometry information according to embodiments, an octree technique or a trisoup technique may be used. When the octree technique or the trisoup technique is used for geometry information voxelization and management of occupied voxels, a process of transforming information into information on vertex segments for forming a triangle may be included (For details, refer to the description above with reference to FIG. 4, etc.)

According to embodiments, the attribute information compression process may include a prediction transform scheme, a lift transform scheme, and/or a RAHT scheme (For details, refer to the description above with reference to FIG. 4, etc.)

According to embodiments, the point cloud encoding process includes geometry coding and attribute coding. Therefore, in terms of the compression quality, geometry coding and attribute coding may be applied differently. Since a point cloud reconstructed as a result of the geometry compression is used as an input to the attribute coding, the quality of the geometry compression may affect the attribute coding.

The quality of the geometry and attribute compression may be controlled by quantization values. The geometry quality may also be controlled according to overlapping point processing.

When controlling the quality of the geometry and attribute compression, it may be necessary to consider the followings.

According to embodiments, the point cloud encoding process may need region-wise adaptive quantization adjustment/application according to the characteristics of the point cloud content and the service. For example, it is important to preserve an important region as much as possible because the captured region close to the equipment is important for the data captured during self-driving on the road. For a terrain of flight simulation, quick loading of a point cloud of a large area may be a bigger issue than preserving the close area of the terrain. This may be possible because the plane and the terrain are far apart from each other. In this case, it may be necessary to quantize an area having a high distribution with a greater value. Therefore, it may be necessary to adjust the quality by adjusting the quantization value for each area according to the point distribution of the content and the characteristics of the service.

As a method of dividing a region in the point cloud encoding process according to embodiments, a tile and a slice may be used. However, an ideal slice may be divided based on about 1,100,000 points, and tiles may be composed of one or more slices, which may be a larger unit. Since slices are implemented in parallel, related information may not be exchanged between slices in compression. Therefore, in addition to a method of dividing a region into tiles or slices, a method of partitioning a point cloud into units (blocks) smaller than the slices and performing compression while exchanging information about different regions in block partition and compression may be needed.

In relation to the above-described object, the method/device according to the embodiments provides a method for region-wise applying/adjusting adaptive quantization according to a characteristic of content and a characteristic of a service. Specifically, in the present disclosure, a method of applying the secondary geometry quantization step, a method of constructing an octree based on partitioned regions, and/or a signaling method to support the aforementioned methods will be described. In this regard, changes and combinations of the embodiments are possible, and terms used herein can be understood based on the intended meaning of the terms within a range in which the terms are widely employed in the relevant field.

The method of applying point cloud distribution-based region-wise adaptive quantization according to the embodiments may be executed in PCC attribute encoding by the PCC encoder, and the information may be reconstructed through the PCC attribute decoding process by the PCC decoder.

Figure 20:
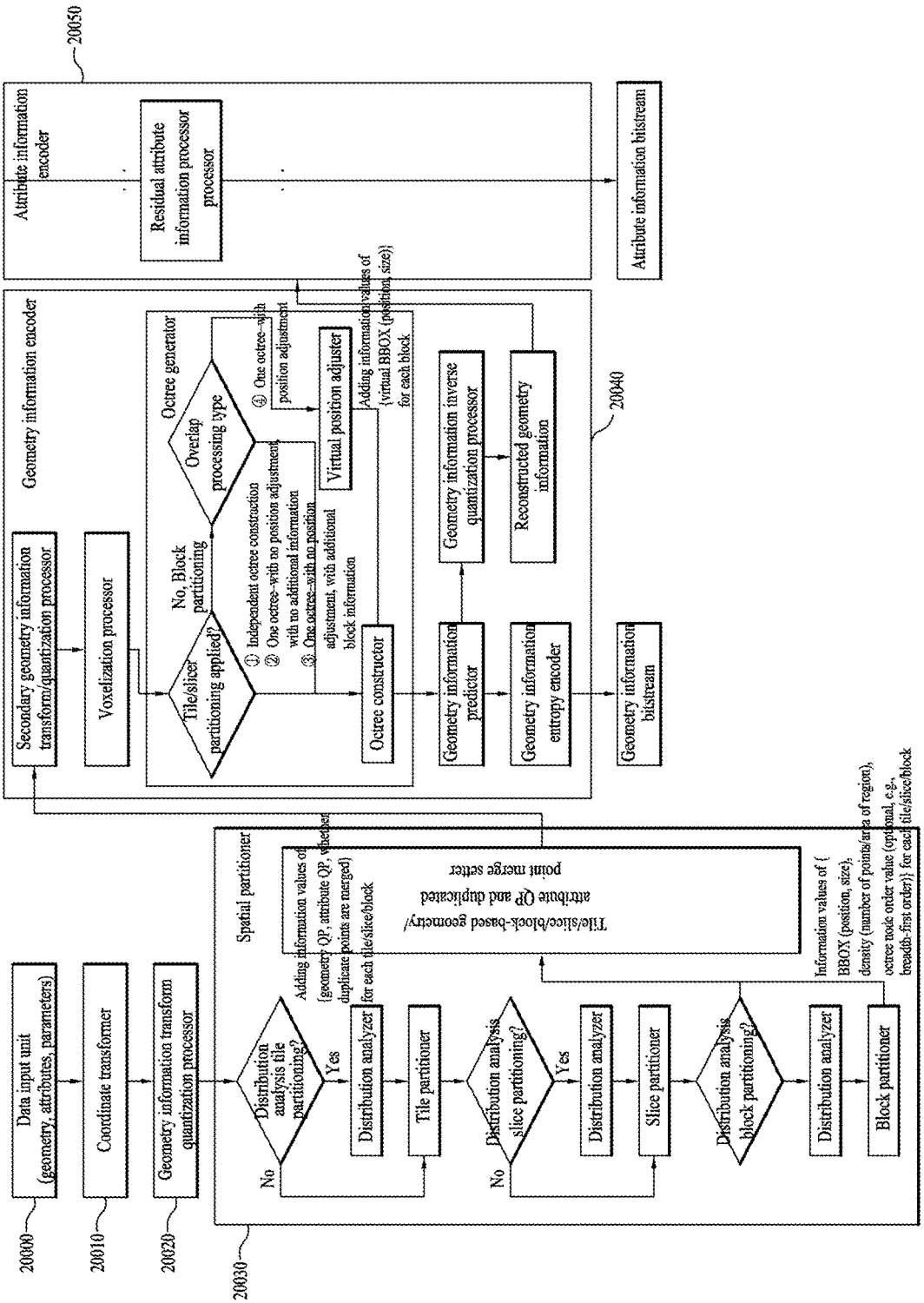
FIG. 20 illustrates an example of geometry encoding and attribute encoding according to embodiments.

For example, the transmission device 10000 of FIG. 1, the point cloud video encoder 10002, the encoding 20001 of FIG. 2, the geometry/attribute encoding process of FIG. 4, all/part (12000 to 12012) of the point cloud encoder of FIG. 12, the point cloud encoding, file/segment encapsulation, and the like of the PCC system of FIGS. 14 and 15, the XR device 1730 of FIG. 17, all/part (20000 to 20050) of the point cloud encoder of FIG. 20, and the like may process, at the transmitting side, point cloud distribution-based region-wise adaptive quantization according to embodiments to be described later. Hereinafter, the above-described components may be simply referred to as a method/device according to embodiments.

Figure 21:
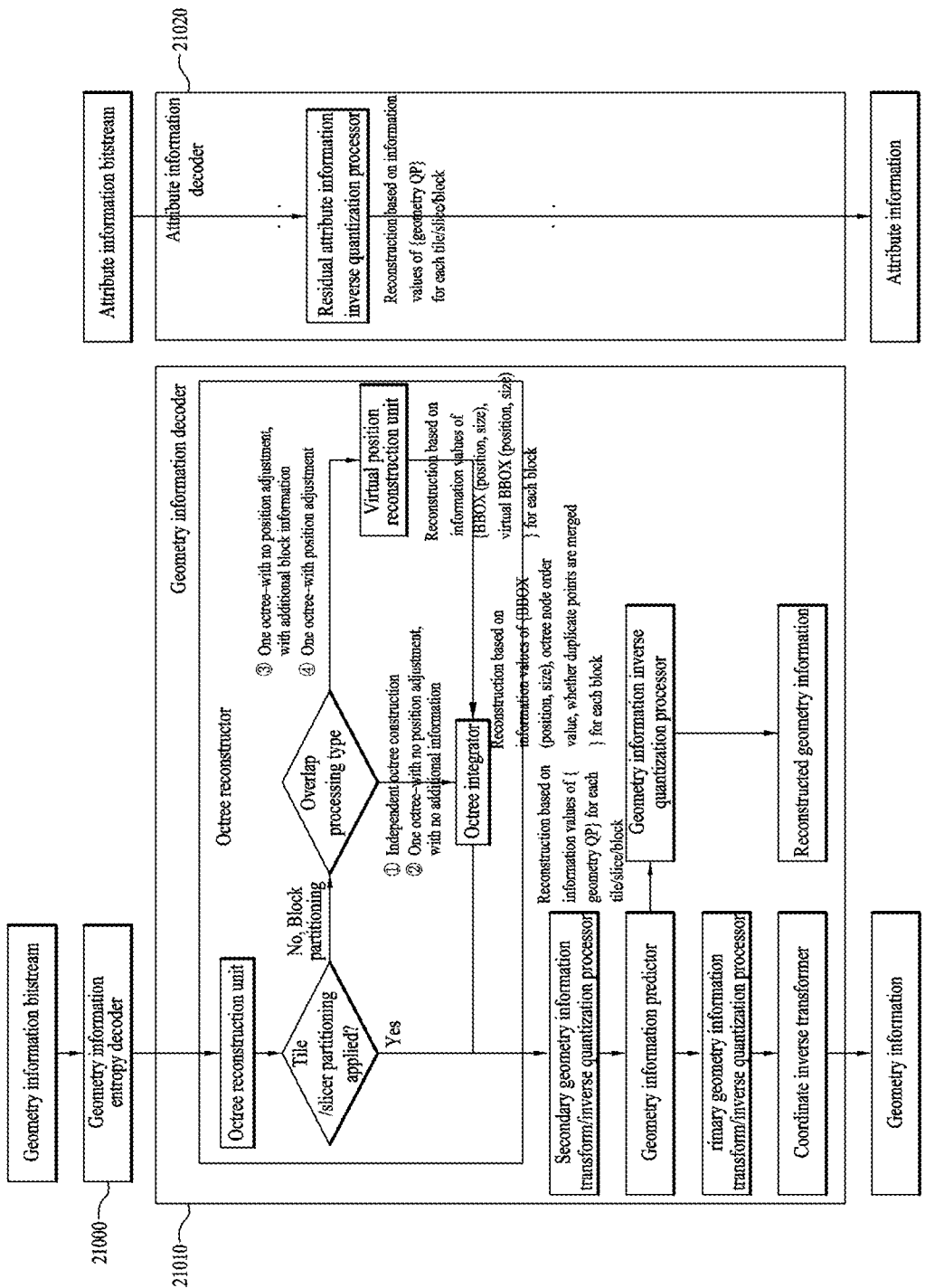
FIG. 21 illustrates an example of geometry decoding and attribute decoding according to embodiments.

In addition, the reception device 10004 of FIG. 1, the point cloud video decoder 10006 of FIG. 1, the decoding 20003 of FIG. 2, the geometry/attribute decoding process of FIG. 11, and all/part of the point cloud decoder (13000 to 13011) of FIG. 13, the point cloud decoding, file/segment decapsulation, and the like of the PCC system of FIGS. 14 and 16, the XR device 1730 of FIG. 17, all/part of the point cloud decoder (21000 to 21020) of FIG. 21 may process, at the receiving side, point cloud distribution-based region-wise adaptive quantization according to embodiments, which will be described later. Hereinafter, the above-described components may be simply referred to as a method/device according to embodiments.

According to embodiments, regarding region partitioning and preparation for QP setting, a point cloud data encoder including a geometry encoder and/or an attribute encoder may perform operations of: 1) adjusting position values of points; 2) analyzing point cloud distribution; 3) partitioning a region; 4) adjusting geometry and attribute QPs of the partitioned region; and/or 5) setting whether to merge duplicated points of the partitioned region, and the like.

In addition, regarding the region-wise adaptive quantization application/adjustment scheme, the point cloud data encoder including the geometry encoder and/or the attribute encoder may perform operations of: 1) secondary quantization of points; 2) voxelization of the points; and/or 3) octree construction.

In addition, in the octree construction, 1) a method of processing region overlap may be executed.

Hereinafter, detailed operations in each of the above-described embodiments will be described below.

A detailed process of region partitioning and preparation for QP setting related to the geometry and/or attribute encoding according to the embodiments is configured as follows.

1) Adjusting Position Values of Points According to Embodiments

The encoder according to the embodiments may find the minimum x, y, and z position values of all points and subtract the same from the position values of each point. Through this process, the left, bottom, front position of point cloud content may be adjusted as the origin (0, 0, 0). In addition, movement or rotation information may be received as user information and the input movement value or rotation value of points may be applied to all points of the point cloud. In addition, a full scale value may be received and applied to the position values of the points. The scale value may be considered as an overall geometry quantization parameter. Accordingly, in lossless geometry coding, the scale value may be fixed to 1. In lossy geometry coding, a value less than 1 may be specified as the scale value. Primary geometry quantization may be applied by applying the full scale value.

2) Analyzing Point Cloud Distribution According to Embodiments

In the point cloud data encoding process, when an automatic region-wise QP adjustment flag is set, a position distribution analysis may be performed for content. The content point cloud distribution analysis process may provide information about the distribution of the points with respect to each axis, and the subsequent encoding process may automatically set a geometry QP value for each region based on the information. Alternatively, an attribute QP value may be automatically set. The set QP information may be signaled to the decoder as signal information (or metadata).

For example, the method/device according to the embodiments may analyze the number of points of the point cloud data for each of the x, y, and z axes to analyze the degree of distribution (or density) of points according to distances for each axis.

Depending on the environment of the point cloud service, the QP value may be applied based on the degree of distribution in quantizing the geometry information and attribute information of the point cloud data. This is because, depending on the type of point cloud content, a large value of QP or a small value of QP may be applied to a portion with high degree of distribution depending on distance, for example, road driving data or flight driving data.

3) Partitioning a Region According to Embodiments

In the point cloud data encoding process, when the automatic region-wise QP adjustment flag is set, regions may be automatically partitioned according to the point distribution. Depending on the point distribution on each axis, related information may be received as an input from the user and a partitioning criterion may be generated for each axis and each step. The degree of partitioning may be input and applied.

The partitioned region unit may be set as a tile, a slice, and/or a block (a smaller region obtained by partitioning a slice).

There may be various methods of obtaining a partitioning region range on each axis.

For example, the methods include setting a partitioning region range for uniform partitioning, setting a partitioning region range according to a distribution ratio, and setting a partitioning region range according to an octree node region and a distribution ratio.

Each region may include point density value and bounding-box information (location, size).

In the partitioning according to the octree node and the distribution ratio, an order value such as set breadth-first/depth-first of the octree node may be used instead of the bounding box.

For example, the method/device according to the embodiments may partition point cloud data into tiles/slices/blocks, or the like.

A tile is a partitioned region of a space. For example, one room may correspond to a tile.

A slice is a partitioned region of a tile. A tile may be divided into a plurality of slices based on the number of predetermined points in the tile. In addition to the tile unit, a tile may be further divided into slices for parallel and fast processing. PCC encoding/decoding may be performed on a slice-by-slice basis.

A block is a partitioned region of a slice. The block is intended to process the slice-by-slice PCC encoding/decoding process in more detail. A slice may be partitioned into one or more blocks. Different parameters may be variously applied on a block-by-block basis while one slice is encoded/decoded.

There may be various units for region partitioning, such as tiles, slices, and blocks.

Regarding the method for region partitioning, A) in the case of uniform region partitioning, when a region where points are present is partitioned based on the number of partitions with respect to each axis, the range of one region may be obtained. The method/device according to the embodiments may uniformly obtain a range of a region with respect to each axis. As a partitioning method, all points are partitioned into region ranges for each axis based on a region with the highest distribution. The partitioning is repeated for each axis. The number of partitions may be received as an input and applied.

For example, when the number of partitions for each axis is 2, the region may be partitioned into 50% distribution units. A range corresponding to 50% with respect to the X-axis, 50% with respect to the y-axis, and 50% with respect to the z-axis may be obtained, and regions may be partitioned by a combination of the x, y, and z-axis regions.

B) In the partitioning based on the distribution ratio, the method/device according to the embodiments may receive the partition reference information on the distribution ratio of points for each axis to perform partitioning. For example, when partition block 1 is received as the top 50% with respect to the x-axis, the range of a partitioned region of a block belonging to block 1 may be calculated according to the percentage of the number of points belonging to the region in the total number of points based on the region with the highest distribution of points. When the partitioned region for each axis is obtained, the point cloud region may be partitioned according to the region partition criterion for each axis to construct blocks. The construction method is the same as the example described above regarding the uniform partitioning.

C) In the partitioning based on the octree node region and the distribution ratio, the method/device according to the embodiments receives reference information on the point distribution ratio with respect to each axis, check the distribution ratio around the octree nodes, and check the range of the distribution ratio of the octree nodes based on the received reference information to perform partitioning based on the octree nodes. The content may be partitioned according to the partitioning method, and a partitioned region may be set as one tile, slice, or block according to the selected region unit. The partitioning method may be signaled for the reconstruction operation in the decoder. In constructing a partitioned region, the order of x, y, z axes may be changed to another older (y, z, x, or the like), and the changed order may be signaled. Additional information about each tile, slice and block may be signaled. It may have a point density. The density may be calculated as the number of points/region of the region. Each tile, slice, and block may have bounding-box (location, size) information about each block. In the case of partitioning based on the octree node and the distribution ratio, an order value such as the set breadth-first/depth-first of the octree node may be used instead of the bounding box.

4) Adjusting the Geometry and Attribute Quantization Points or Quantization Parameters (QPs) of the Partitioned Region According to Embodiments After a region is partitioned through the region partitioning and blocks (or tiles/slices, etc.) are generated through the region partitioning operation, the point cloud data encoding process may adjust the geometry QP and the attribute QP for each block. The QPs set for each block may be automatically set according to the point density in the block, or a QP value according to each point density may be received and set. The method/device according to the embodiments may adjust the QP value in various ways according to the point cloud service, by, for example, applying a large QP value or a small QP to a high density region in performing quantization (secondary quantization).

The QP value may be applied in the secondary geometry quantization operation and the attribute value quantization operation. In the case of the geometry QP, one QP value may be given, or the QP may be applied differently to each of x, y, and z. The QP value of a block with the highest level of detail may be 1. As the level of detail is lowered, the QP value may decrease below 1.

5) Setting Whether to Merge Duplicated Points of the Partitioned Region According to Embodiments After a region is partitioned and blocks are generated through the region partitioning operation, the point cloud data encoding process of the method/device according to the embodiments may set whether to merge duplicated points into each block differently. The setting may be automatically established according to the point density, or indication of whether to merge duplicated points according to each point density may be received and set. When the setting is automatically established, it may be set such that different policies are provided depending on the service, as in QP settings. When real-time operation is important, the number of points may be reduced by merging points into a block with a high density. When the geometry of a key region is important, points may be preserved without point merging.

A specific operation of the method for applying and/or adjusting region-wise adaptive quantization in relation to geometry and/or attribute encoding according to the embodiments is performed as follows:

1) Secondary Quantization Operation for Points According to Embodiments

The point cloud data encoding process by the method/device, the geometry information encoder or the like according to the embodiments, for example, the geometry encoding process, may perform the secondary quantization process on geometry information. The points in a region may be quantized by applying a set or specified geometry QP value to the points. The quantized geometry position information may be integerized.

2) Voxelization Operation for Points According to Embodiments

The point cloud data encoding process by the method/device, the voxelization processor, or the like according to the embodiments may voxelize the secondarily quantized geometry information. For example, a cube having a width, depth, and height equal to 1 may be set as one voxel. The integerized point position value may be a voxel position information value having a point. Several points may belong to one voxel. Depending on the indication of whether overlapping is allowed, which is set for each tile, slice, or block, points may be integrated into a corresponding voxel, or point position information may be directly coded for an additional point. When points are integrated into one, an operation of setting a representative color for the point may be included in a later operation, resulting in a loss in terms of geometry and attributes. Operations after voxelization will be described with reference to the following drawings.

Figure 18:
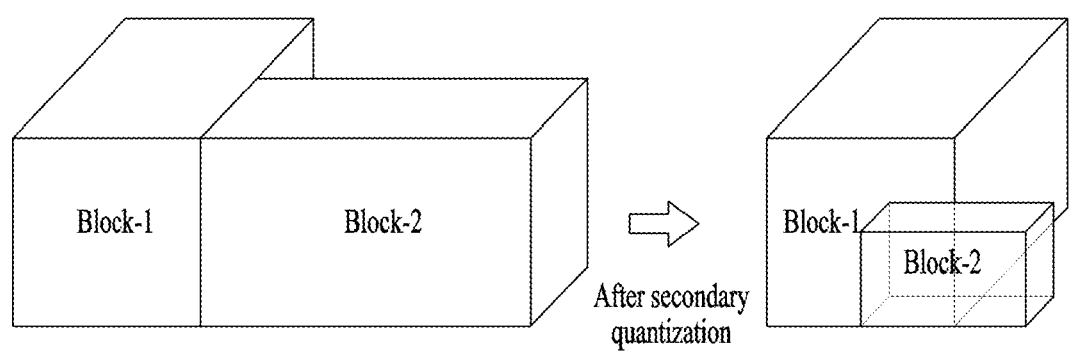
FIG. 18 illustrates an example of block quantization and region change according to embodiments.

FIG. 18 illustrates an example of block quantization and region change according to embodiments.

Hereinafter, a process of encoding/decoding point cloud data based on blocks will be described with reference to FIGS. 18 to 28.

Figure 19:
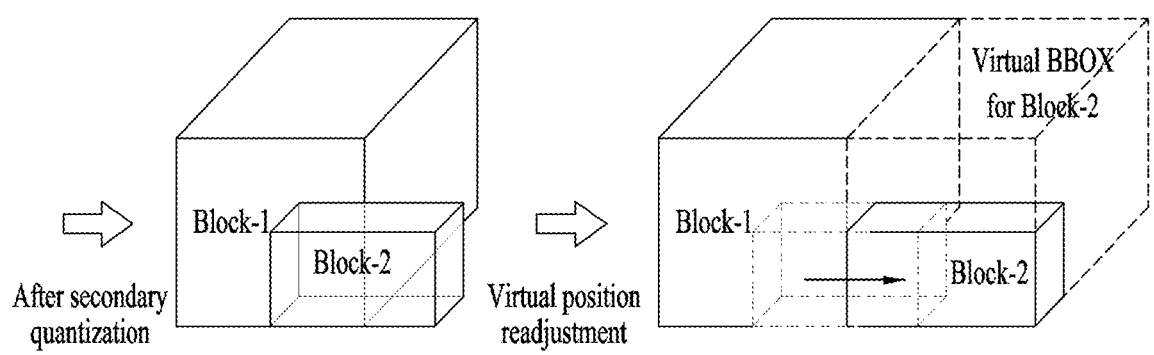
FIG. 19 illustrates an example of virtual position readjustment of a block according to embodiments.

Based on the blocks of FIGS. 18 and 19, the encoder of the point cloud data transmission device (e.g., the point cloud video encoder 10002 of FIG. 1), the encoding process (e.g., the encoding 20001 of FIG. 2), the geometry encoding process of the point cloud data (e.g., the coordinate transformer 40000 and/or the voxelizer 40001 of FIG. 4), the quantizer, the voxelizer, and/or the octree generator of the encoding process, the attribute transform processor (e.g., the quantization processor 12001, the voxelization processor 12002, the octree generator 12003, and the attribute transform processor 12009 of FIG. 12), and/or the point cloud encoder (e.g., the point cloud encoder of FIG. 14 and/or the point cloud encoder of FIG. 15) according to the embodiments may perform geometry encoding, for example, quantization, voxelization, and/or octree generation.

Based on the blocks of FIGS. 18 to 19, the decoder of the point cloud data reception device (e.g., the point cloud decoder 10006 of FIG. 1), the decoding process (e.g., the decoding 20003 of FIG. 2), the geometry decoding process of the point cloud data (e.g., the arithmetic decoder 11000 and/or the octree synthesizer 11001 of FIG. 11), the octree reconstructor and/or the inverse quantization processor of the point cloud decoding process (e.g., the octree reconstructor 13003 and/or the inverse quantization processor 13008 of FIG. 13), and the point cloud decoder (e.g., the point cloud decoder of FIG. 16) according to the embodiments may perform geometry decoding, for example, octree reconstruction and inverse quantization processing.

3) Octree Construction Operation According to Embodiments

The geometry encoding, geometry encoder, and/or octree generator may voxelize points and generate an octree for the points. The octree construction refers to a process of repeating the process of dividing the entire region into 8 sub-regions by dividing the x-axis, y-axis, and z-axis after the number of points is adjusted, and presenting occupancy bits to indicate whether a point is present in each region.

When the partitioned region unit is a tile or a slice, it is independently encoded, and therefore one octree may be generated for each partitioned region.

However, when the region is partitioned into blocks, which are a unit smaller than a slice, it is necessary to consider processing of overlapping in a region that occurs due to secondary quantization in the octree construction operation. For example, as shown in the figure, when the QP value for block-1 is 1 and the QP value for block-2 is 0.5, there may be a section in which the two blocks overlap each other. A method of processing a region of block-2 belonging to block-1 according to embodiments will be described below. Blocks according to the embodiments may be distinctively referred to as a first block and a second block in the present disclosure. In addition, a block, which is a unit of spatial partition, may correspond to a bounding box or be included in the bounding box. The block may be referred to as a bounding box.

4) A Method for Processing Overlapping Regions According to Embodiments Regarding the Octree Construction Operation The overlap between regions occurring due to the secondary quantization does not raise any issue in tiles or slices. Since each tile or slice, which is independently encoded, is configured into an octree, the overlap may not affect the occupancy bits. However, in the case of blocks, a method of processing the overlapping regions is required. There may be various processing methods:

<Independent Octree Construction>

The method/device according to the embodiments, for example, the octree constructor (which may be referred to as an octree generator, an octree generator, or the like) according to the embodiments may configure each block into an individual octree. In this case, the overlap may not affect the occupancy bits.

<Constructing One Octree—with No Position Adjustment, No Storage of Additional Information>

The method/device according to the embodiments, for example, the octree constructor according to the embodiments, may configure all blocks belonging to a slice based on one octree. That is, the previous octree construction scheme may be maintained, ignoring the overlapping regions. Therefore, artifacts may occur in the overlapping area. This is because there is no problem with the points belonging to block-1, but points belonging to block-2, points belonging to block-2 belong to block-2 may be adjusted so as to belong to block-1 based on the position information changed through the secondary quantization (or the primary quantization, etc.). Accordingly, in reconstructing the points through decoding, the positions belong to block-1, and thus a secondary inverse quantization process corresponding to block-1 may be performed. As a result, in the figure, there may be a possibility that the left half of block-2 will fail to be reconstructed. However, according to embodiments, when the difference between QP values of the respective blocks is rarely about 0.5 as in the previous example, the difference in the QP value between adjacent regions may not be very large. Accordingly, there will be an overlapping area between the adjacent regions, but it may be negligible because the overlapping area may not be large. In this case, the position of the block is not adjusted according to the overlap, and additional information does not need to be stored.

<Constructing One Octree—with No Position Adjustment, with Storage of Additional Information>

The method/device according to the embodiments, for example, the octree constructor according to the embodiments, may configure all blocks belonging to a slice based on one octree. That is, the previous octree construction scheme may be maintained, ignoring the overlapping regions. Therefore, artifacts may occur in the overlapping area. There is no problem with the points belonging to block-1. However, for the points that belong to block-2 but are adjusted to belong to block-1 through position information changed through secondary quantization, the positions thereof belong to block-1 at the time of reconstruction in the decoding, and thus a secondary inverse quantization process corresponding to block-1 may be performed. Accordingly, referring to the figures, there may be a possibility that the left half of block-2 will fail to be reconstructed.

To prevent this issue, the method/device according to the embodiments, for example, the octree constructor according to the embodiments, may perform secondary quantization, and add a block ID of points present in a voxel of the overlapping area. When there are points belonging to different blocks, the number of overlapping blocks may be coded for the number of overlapping points, and block information belonging to information about each overlapping point may be added. In this method, additional block information may be stored without adjusting the position of the block according to the overlap.

Accordingly, the method/device according to the embodiments may encode/decode with low latency by spatially partitioning the point cloud data in consideration of the type of the point cloud data and/or the service provision environment. Further, it may provide signaling while processing an overlap occurring due to partitioning and quantization.

FIG. 19 illustrates an example of virtual position readjustment of a block according to embodiments.

Next, a processing method for an overlapping area in the case of a block will be described with reference to FIG. 19.

<Constructing One Octree—with Position Adjustment>

The method/device according to the embodiments, for example, the octree constructor according to the embodiments, may configure all blocks belonging to a slice based on one octree. In configuring the blocks based on one octree, a virtual position of each block may be needed. The virtual position of each region may be virtually readjusted based on a virtual high QP, and a position adjustment value (offset) may be set to shift all blocks to the left, bottom, front position of the virtually readjusted region. The reference position for adjustment does not need to be the left, bottom, front position, and may be set differently according to embodiments. Since only the geometry of the current block is allowed to be present in the virtual region, the blocks are adjustable to a position such as the right, bottom, front position or the left, top, back position to keep the octree compact.

As shown in the figure, after the secondary quantization, there may be a region where block-1 and block-2 overlap each other. The figure shows a process of processing bounding box-1 corresponding to block-1 and bounding box-2 corresponding to block-2 by a virtual position adjuster and an octree constructor of the octree generator. After the virtual position readjustment, the position of block-2 overlapping with a partial area of the block-1 (bounding box 1) is adjusted to a new virtual bounding box.

In this method, the position of the block may be adjusted and an octree may be constructed based on the adjusted virtual position.

When the points are divided into blocks, occupancy bits may be formed after processing the region overlap.

The region overlap processing method may be signaled and transmitted to the decoder, and may be used by the point cloud data reception device according to the embodiments in reconstructing the octree. In addition, the set attribute QP value may be applied in attribute compression.

In the case where not only the block but also the partitioned region is a tile/slice/block, the partitioned region (tile/slice/block) in which overlap occurs in the quantization operation may be processed according to the above-described embodiments.

Hereinafter, the operation of the above-described embodiments will be described from the perspective of the point cloud encoder and/or the point cloud decoder according to the embodiments.

The method/device according to the embodiments may prevent data loss or deterioration of the quality of point cloud content by preventing overlapping regions from occurring due to a change in regions that may occur in quantizing a plurality of blocks/bounding boxes.

The method/device according to the embodiments may quickly and efficiently provide point cloud content to a user through an operation configuration and a signaling structure therefor according to the embodiments. In the process of partitioning points into blocks or the like, the point cloud content may be partially accessed according to the necessity of the data and the provision environment. Accordingly, the data may be quickly encoded/decoded with various settings, and even an overlap occurring due to quantization may be effectively processed through an overlap processing method. In addition, the virtual block (virtual bounding box) may address the issue of incorrect encoding/decoding/rendering of points caused by an overlap of data (points).

FIG. 20 illustrates an example of geometry encoding and attribute encoding according to embodiments.

Each component of the geometry encoding and attribute encoding and/or the encoder according to embodiments will be described below.

A data input unit 20000 may receive data containing geometry information, attribute information, and/or parameter(s) for geometry/attributes of point cloud data.

A coordinate transformer 20010 may receive geometry information and transform the coordinates. For example, it may transform existing coordinates to other coordinates. Alternatively, the coordinate transformation may not be performed. The coordinate-transformed geometry information may be input to the geometry information transform/quantization unit.

A quantization processor (or primary geometry information quantization processor) 20020 may first quantize the geometry information. For example, it finds the minimum x, y, and z position values of all points, subtracts the same from the position values of each point, multiplies the obtained values by a set quantization scale value, and round the values from the multiplication to the nearest integer values.

A spatial partitioner 20030 may perform the above-described region partitioning and/or the QP setting preparation operation.

The spatial partitioner 20030 may set whether to partition tiles based on distribution analysis. When the distribution analysis-based tile partitioning is performed, the distribution analysis operation may be performed. When the distribution analysis-based tile partitioning is skipped, the tile partitioning may be performed without the distribution analysis operation.

A distribution analyzer checks the user and/or the PCC system to determine whether to perform distribution analysis. When the distribution analysis is to be performed, the distribution analyzer analyzes the degree of distribution of a point cloud. For example, it analyzes the distribution degree (density) of points of the point cloud data with respect to each axis. The distribution analyzer may check the number/distribution degree/density of points by distance with respect to each axis.

A tile partitioner partitions the point cloud data based on tiles. A tile means a spatial partition unit. For example, one room may correspond to one tile. In addition, depending on whether the distribution analyzer is executed, the space of the point cloud data may be partitioned into tile(s) in consideration of the degree of distribution with respect to each axis analyzed by the distribution analyzer, and/or a partitioning policy other than the distribution analyzer, and/or the space of the point cloud data may be partitioned into tile(s) according to the partition policy or the set value of the PCC system, not the distribution analyzer.

In addition, the spatial partitioner may perform distribution analysis and set whether to partition a slice. When the distribution analysis-based slice partitioning is performed, the distribution analysis may be performed. When the distribution analysis-based slice partitioning is skipped, the slice partition operation may be performed without the distribution analysis.

As described above, the distribution analyzer analyzes the number of points, density, and degree of distribution of the point cloud data with respect to each axis and by distance.

The slice partitioner partitions the point cloud data on a slice basis. A slice means a unit in which a tile is partitioned. For example, a unit in which one tile is divided into a set of points corresponding to a specific number may be a slice. Depending on whether the distribution analyzer is executed, the space of the point cloud data may be partitioned into slice(s) in consideration of the degree of distribution analyzed by the distribution analyzer, and/or may be partitioned into slice(s) according to the partitioning policy or the PCC system setting value other than the analyzed distribution degree.

In addition, the spatial partitioner may set whether to partition a block by performing distribution analysis. When the distribution analysis-based block partitioning is performed, the distribution analysis may be performed. When the distribution analysis-based block partitioning is skipped, the block partitioning operation may be performed without the distribution analysis.

As described above, the distribution analyzer analyzes the number of points, density, and degree of distribution of the point cloud data with respect to each axis and by distance.

The block partitioner partitions the point cloud data on a block basis. A block means a unit in which a slice is partitioned. For example, a unit in which one slice is partitioned in order to encode/decode the slice in detail may be a block. Depending on whether the distribution analyzer is executed, the space of the point cloud data may be partitioned into block(s) in consideration of the degree of distribution analyzed by the distribution analyzer, and/or may be partitioned into block(s) according to the partitioning policy or the PCC system setting value other than the analyzed distribution degree.

In addition, the tile/slice/block partitioner described above may partition the space of the point cloud data based on each partitioning unit (tile/slice/block). In this case, the partitioned region may be represented as a bounding box.

The tile/slice/block partitioner may generate information on each tile/slice/block, and deliver the same in a parameter of a bitstream. For example, there may be signaling information such as the position of the bounding box, the size of the bounding box, the density (number of points/area of the region), and an octree node order value.

Alternatively, when the distribution analysis-based block partitioning is skipped, the spatial partitioner may set a geometry/attribute QP value for each tile/slice/block without the block partitioning operation, and set whether to perform duplicated point merging.

Alternatively, after performing the block partitioning operation, the spatial partitioner may set a geometry/attribute QP value for each tile/slice/block, and set whether to perform duplicated point merging.

After partitioning the space of the point cloud data into bounding boxes for each partitioned region (tile/slice/block), the spatial partitioner may set a QP to be applied for a quantization operation in the partitioned geometry information and attribute information. Furthermore, there may be duplicated points depending on partitioning and QP, and whether to merge these duplicated points may be set.

In addition, the spatial partitioner may generate information on each tile/slice/block, and deliver the same in a parameter of a bitstream. For example, the signaling information may include a geometry QP, an attribute QP, and information indicating whether to merge duplicated points.

The geometry information encoder 20040 encodes geometry information of the point cloud data. Specifically, it may include a secondary geometry information transform/quantization processor, a voxelization processor, an octree generator, a geometry information predictor, a geometry information inverse quantization processor, a geometry information entropy encoder, and/or a geometry information reconstructor.

The secondary geometry information transform/quantization processor may apply a geometry quantization value to points according to a geometry QP for each tile, slice, and/or block. Quantization is a process of reconstructing the position information about each point in the acquired entire point cloud, and represents an operation of performing quantization on the position information. The minimum x, y, and z position values of all points are found and subtracted from the position values of each point, then multiplied by a set quantization scale value, and then rounded to the nearest integer values.

The voxelization processor may determine a point value on which geometry encoding is to be performed according to whether to merge duplicated points for each tile, slice, and/or block. Voxelization represents octree-based voxelization performed based on position information about points to reconstruct each point of the point cloud to which the quantization process has been applied. Specifically, as in the case of a pixel, which is the smallest unit that contains information about a 2D image/video, a 3D cubic space formed by dividing a 3D space into units (unit=1.0) based on each axis (x, y, z axis) to store the information about the points present in the 3D space is called a voxel, and the process of matching points present in the 3D space with a specific voxel is called voxelization. Voxel is a compound word that combines volume and pixel. Spatial coordinates of a voxel may be estimated in a positional relationship with a voxel group. In addition, like the pixel, the voxel may have color or reflectance information.

One voxel may not only have one point. One voxel can have multi-point-related information. Alternatively, the information can be integrated into one-point information in one voxel. This adjustment can be performed selectively. When one voxel is expressed as one point, the position value of the center of the voxel can be set based on the position values of points present in the voxel, and it is necessary to perform an attribute transform process related thereto. For example, the attribute transform process may adjust the values to the average of the color or reflectance of points included in the voxel or the center position value of the voxel and the neighbor points within a specific radius.

The octree generator may construct an octree corresponding to the point cloud data. The octree generation refers to a process of constructing an octree corresponding to point cloud content in order to efficiently manage the region/position of the voxel described above.

Specifically, when the entire space is divided based on the x-axis and y-axis in order to efficiently manage the space of the 2D image, 4 spaces are created. When each of the 4 spaces is divided based on the x-axis and y-axis, 4 spaces are created for each small space. The regions are divided until the leaf node becomes a pixel. In order to efficiently manage the regions by size and position thereof, a data structure of a quadtree may be used. Similarly, the same method is applied to efficiently manage the 3D space according to the position and size of the space. However, since the z-axis is added, 8 spaces are created when a space is divided based on the x-axis, y-axis, and z-axis. When each of the 8 spaces is divided based on the x-axis, y-axis, and z-axis again, 8 spaces are created for each of the small spaces. The regions are divided until the leaf node becomes a voxel, and an octree data structure capable of managing eight child node regions may be used to efficiently manage the regions by size and position.

The octree may be expressed as an occupancy code. When there is a point at each node, this is indicated by 1. When there is no point at each node, this is indicated by 0. Each node has an 8-bit bitmap indicating the occupancy status of 8 child nodes. Entropy coding of occupancy code is performed through the arithmetic coder. The generated occupancy code may be directly encoded or may be encoded through an intra/inter-coding process to increase compression efficiency. The receiver may reconstruct the octree based on the occupancy code.

Referring to the figure, the octree generator checks whether to apply tile/slice partitioning. In the case where tile/slice partitioning is applied, the operation of the octree constructor is processed. In the case where tile/slice partitioning is not applied, but block partitioning is applied, the overlap processing type is checked.

In the case where block partitioning is applied, the overlap processing types include A) independent octree construction, B) one octree—with no position adjustment, with no additional information, C) one octree—with no position adjustment, with additional block information, and D) one octree—with position adjustment.

In the case of A) independent octree construction, B) one octree—with no position adjustment, with no additional information, and C) one octree—with no position adjustment, the octree generator performs the operation of the octree constructor. In the case of D) one octree—with position adjustment, the octree generator performs an operation of the virtual position adjuster.

The octree constructor constructs an octree of spatially partitioned point cloud data based on a tile/slice/block (types A, B, and C).

The virtual position adjuster adjusts the octree position to a virtual position in order to process the overlap of the point cloud data. The virtual position adjuster may generate information on each block and deliver the same through parameters of a bitstream. For example, the signaling information for each block may include the position of a virtual bounding box and the size of the virtual bounding box. Subsequently, the octree constructor constructs an octree based on the point cloud data adjusted to the virtual position.

In the case of block partitioning, the octree generator may receive an octree overlap processing method. The method may include independent octree construction, construction of one octree with no position adjustment and with no additional information, construction of one octree by adding block ID information to the overlap area without position adjustment, and construction of one octree with position adjustment. The overlap processing method may be signaled to the decoder.

In addition, in block partitioning, when one octree is constructed without position adjustment, signaling indicating a block to which a point belonging to a voxel of an overlapping area belongs in the voxel.

In addition, in block partitioning, when one octree is constructed and positions are adjusted, the virtual position adjuster may readjust the regions of the respective blocks based on the highest QP, and set a reference position to construct a virtual bounding box (position, size). The reference position may be the left, bottom, front position (as shown in, for example, FIG. 19), or may be another position. The virtual bounding box may be signaled to the decoder.

In addition, in block partitioning, when one octree is constructed and positions are adjusted, the virtual position adjuster may construct an octree with one region configured by removing the overlapping area.

The geometry information predictor predicts geometry information based on the geometry information about the points in the memory and generates the predicted geometry information. The prediction information used for prediction is encoded through an entropy encoding process. The geometry information predictor performs the same/similar operation as the intra/inter-coding processor.

The geometry inverse quantization processor receives the geometry information (e.g., residual geometry information) and scales the same to a quantization value to reconstruct the geometry information (residual geometry information). The reconstructed residual geometry information may be reconstructed as geometry information in addition to the geometry information predicted by the geometry information predictor and stored in a memory. The reconstructed geometry information (residual geometry information) is input to the attribute encoder.

The geometry entropy encoder may receive the quantized residual geometry information and perform entropy encoding thereon. For the entropy coding, various coding methods such as exponential Golomb, context-adaptive variable length coding (CAVLC), and context-adaptive binary arithmetic coding (CABAC) may be used.

The geometry information encoder 20040 generates a geometry information bitstream.

The attribute information encoder 20050 may include a residual attribute information quantization processor or may perform a residual attribute information quantization process.

The residual attribute information quantization processor of the attribute information encoder may quantize attribute information by applying attribute quantization values to points according to attribute QPs for each tile, slice, and/or block.

The attribute information encoder generates an attribute information bitstream.

The point cloud data transmission method according to the embodiments further includes partitioning the space of the point cloud data based on a partitioning unit, wherein the encoding operation includes encoding the geometry information about the spatially partitioned point cloud data; and encoding attribute information about the point cloud data. The encoding of the geometry information includes generating an octree for the point cloud data.

The decoding in the point cloud data reception device according to the embodiments includes decoding geometry information about the point cloud data, and decoding attribute information about the point cloud data. The decoding of the geometry information includes reconstructing an octree for the point cloud data.

In the operation of generating an octree in the point cloud data transmission method according to embodiments, when the partitioning unit is a block, an octree is constructed for each block, or an octree is constructed (generated) for each slice including the block.

In the operation of generating an octree in the point cloud data transmission method according to embodiments, when the partitioning unit is a block, the octree is constructed for each slice including blocks. When a first block and a second block included in the slice overlap each other, ID information for points in the overlapping region is generated. The ID information may be delivered as signaling information in a bitstream.

In the operation of generating an octree in the point cloud data transmission method according to embodiments, when the partitioning unit is a block, the octree is constructed for each slice including blocks. When a first block and a second block included in the slice overlap each other, the position of the second block is adjusted to an area of a virtual block that does not overlap the first block, based on an offset value.

In the point cloud data reception method according to embodiments, the operation of reconstructing the octree includes checking whether the point cloud data is data partitioned based on a tile or a slice.

In the point cloud data reception method according to embodiments, when the point cloud data is partitioned based on a block, the operation of reconstructing the octree includes checking whether a type of overlap applied to the point cloud data is an independent octree or one octree that does not include position adjustment and additional information.

In the point cloud data reception method according to embodiments, when the point cloud data is partitioned based on a block, it is checked whether a type of overlap applied to the point cloud data is one octree that does not include position adjustment, but includes additional block information, or one octree that includes the position adjustment, and a virtual position of the block for the point cloud data is reconstructed based on signaling information for each block included in the bitstream.

The method/device according to the embodiments, in particular, the spatial partitioner, the geometry information encoder, and/or the attribute information encoder perform the operation according to the above-described embodiments, and thus application/adjustment of region-wise adaptive quantization according to characteristics of content and a service may be provided.

FIG. 21 illustrates an example of geometry decoding and attribute decoding according to embodiments.

Components according to the embodiments are configured as follows.

The geometry information entropy decoder 21000 receives a geometry information bitstream and performs entropy decoding thereon. The geometry information entropy decoder 21000 may perform all/part of the operations of arithmetic decoder. The geometry information entropy decoder 21000 may perform an inverse process of the operation of the geometry entropy encoder.

The geometry information decoder 21010 may decode the geometry information of point cloud data. Specifically, it may include an octree reconstructor, a secondary geometry information transform/inverse quantization processor, a geometry information predictor, a geometry information inverse quantization processor, a geometry information reconstructor, a primary geometry information transform/inverse quantization processor, and/or a coordinate inverse transformer.

The octree reconstructor may perform the reverse process of the octree constructor. Specifically, the octree reconstructor reconstructs an octree from the decoded geometry information bitstream.

The octree reconstructor checks whether tile/slice partitioning is applied. When the tile/slice partitioning is applied to the geometry information, the octree reconstructor performs the operation of the secondary geometry information transform/inverse quantization processor using the reconstructed octree. When tile/slice partitioning is not applied, but block partitioning is applied, the octree reconstructor checks the overlap processing type. The overlap processing types include A) independent octree construction, B) one octree—with no position adjustment, with no additional information, C) one octree—with no position adjustment, with additional block information, and D) one octree—with position adjustment.

In the case of A) independent octree construction, and B) one octree—with no position adjustment, with no additional information, the octree reconstructor performs the operation of the octree integrator.

In the case of C) one octree—with no position adjustment, and D) one octree—with position adjustment, the octree reconstructor performs the operation of the virtual position reconstructor. The virtual position reconstructor reconstructs the position virtually adjusted for overlap processing. Here, the reconstruction operation may be performed based on information about the block included in a parameter of the bitstream, for example, information about the position of the bounding box, the size of the bounding box, the position of the virtual bounding box, and the size of the virtual bounding box. The virtual position reconstructor may perform the reverse process of the operation of the virtual position adjuster.

The octree integrator may reconstruct the octree by integrating blocks according to each overlap processing type. The reconfiguration (restoration) process may be performed based on a parameter (signaling information) of the bitstream. For example, the signaling information may include a position of a bounding box, a size of the bounding box, an octree node order value, and information indicating whether duplicated points are merged.

The secondary geometry transformation inverse quantization processor transforms the geometry information and performs inverse quantization thereon. The secondary geometry transformation inverse quantization processor may perform the process of the geometry inverse quantization processor or an inverse process of the operation of the secondary geometry transform/quantization processor.

The geometry information predictor generates a predicted value of the geometry information. The predicted value of the geometry may be generated so as to be provided to the geometry inverse quantization processor. The geometry information predictor may perform the above-described process or inverse process of the geometry predictor of the encoder.

The geometry inverse quantization processor may inversely quantize the geometry information based on the predicted value of the geometry. The geometry inverse quantization processor may generate and provide reconstructed geometry information for decoding of attribute information. The geometry inverse quantization processor may perform the process of the geometry information inverse quantization processor of the above-described encoder or an inverse process.

The primary geometry transform/inverse quantization processor may transform the geometry information and perform inverse quantization thereon. The primary geometry transform/inverse quantization processor may perform the process of the geometry information inverse quantization processor of the above-described encoder or an inverse process of the secondary geometry information transform/quantization processor.

The coordinate inverse transformer may inversely transform the inversely quantized geometry information. The inverse coordinate transformer may perform the inverse process of the coordinate transformer of the encoder described above. The inverse coordinate transformer generates geometry information.

The attribute decoder 21020 decodes the attribute information based on the reconstructed geometry information.

The attribute decoder 21020 may further include a residual attribute information inverse quantization processor. The residual attribute information inverse quantization processor may inversely quantize residual attribute information included in the attribute information bitstream. Here, signaling information included in the bitstream may be used. For example, inverse quantization is performed based on an attribute QP value as information on each tile/slice/block. The residual attribute information inverse quantization processor may perform an inverse process of the residual attribute information quantization processor of the above-described encoder.

Accordingly, the method/device according to the embodiments, in particular, the geometry information decoder, the octree reconstructor, the inverse quantization processor, and/or the attribute information decoder perform the operation according to the above-described embodiments, and thus application/adjustment of region-wise adaptive quantization according to the characteristics of content and a service may be provided.

Figure 22:
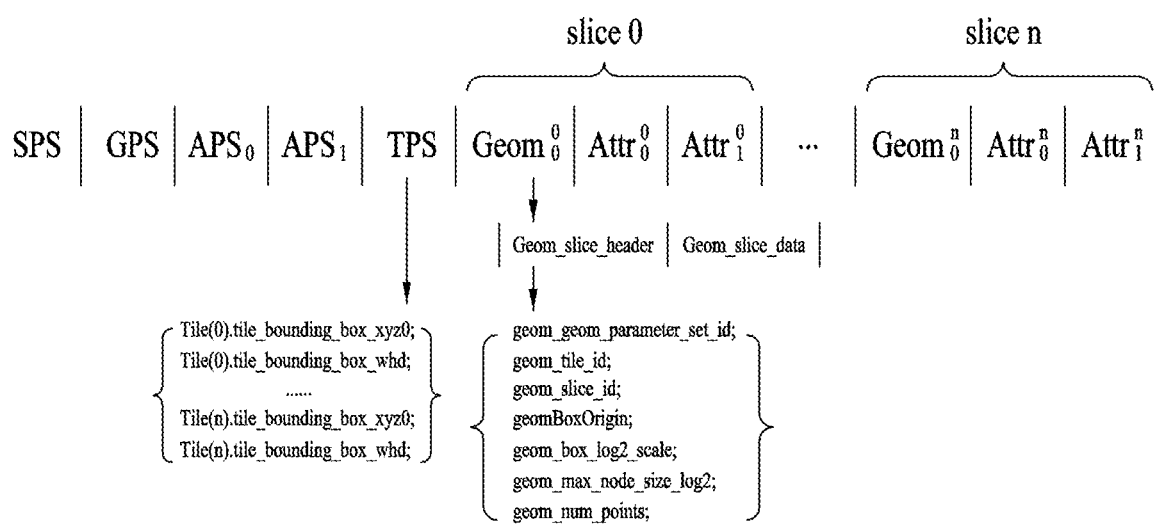
FIG. 22 shows an example of a configuration of an encoded point cloud according to embodiments.

FIG. 22 shows an example of a configuration of an encoded point cloud according to embodiments.

The method/device according to the embodiments may generate and acquire a point cloud bitstream as shown in FIG. 22. For example, a point cloud bitstream including geometry information, attribute information, and/or parameters including metadata for the same may be generated (encoded) and received (decoded) by the transmission device 10000 of FIG. 1, the point cloud video encoder 10002 of FIG. 1, the reception device 10004 of FIG. 1, the point cloud video decoder 10006 of FIG. 1, the encoding 20001 of FIG. 2, the decoding 20003 of FIG. 2, the encoding process of FIG. 2, the decoding process of FIG. 11, the transmission device of FIG. 12, the reception device of FIG. 13, the PCC system of FIGS. 14 to 16, the XR device 2230 of FIG. 17, the PCC encoder/decoder of FIGS. 20 to 21, and the like.

Information for embodiments may be signaled.

Abbreviations used herein have the following meaning: SPS: Sequence Parameter Set; GPS: Geometry Parameter Set; APS: Attribute Parameter Set; TPS: Tile Parameter Set; Geom: Geometry bitstream=geometry slice header+geometry slice data; Attr: Attribute bitstream=attribute brick header+attribute brick data.

Point cloud data according to embodiments may have the form of a bitstream as shown in the figure. The point cloud data may include a sequence parameter set (SPS), a geometry parameter set (GPS), an attribute parameter set (APS), and a tile parameter set (TPS) including signaling information according to embodiments. The point cloud data may include one or more geometries and/or attributes. The point cloud data may include the geometry and/or attributes in units of one or more slices. The geometry may have a structure including a geometry slice header and geometry slice data. For example, the TPS including signaling information may include Tile(0). tile_bounding_box_xyz0 and Tile(0)_tile_bounding_box_whd. The geometry may include geom_geom_parameter_set_id, geom_tile_id, geom_slice_id, geomBoxOrigin, geom_box_log 2_scale, geom_max_node_size_log 2, and geom_num_points.

According to embodiments, the signaling information may be signaled in the SPS, the GPS, the APS, the TPS, or the like.

According to embodiments, the signaling information may be signaled in the TPS, Geom for each Slice, or Attr for each slice.

The structure of the point cloud data according to embodiments may provide an efficient effect in terms of encoding/decoding/data access of parameter set(s), geometry(s), and attribute(s) including signaling information.

The point cloud data related to the point cloud data transmission/reception device according to the embodiments may include at least one of a sequence parameter, a geometry parameter, an attribute parameter, a tile parameter, a geometry bitstream, or an attribute bitstream.

In addition, regarding signaling information related to the operation of the spatial partitioner and/or the spatial reconstructor, the region partitioning related option information may be added to and signaled in the SPS, TPS, or a geometry header for each slice. Quantization related information may be added to and signaled in each tile, slice, or block. For blocks, a block parameter set (BPS) may be generated and signaled. Hereinafter, syntax of specific signaling information will be described with reference to the figures. For reference, the name of signaling information according to embodiments may be modified/extended within the meaning/function range intended by the signaling information. A field of signaling information may be distinctively referred to as first signaling information, second signaling information, or the like.

The method/device according to the embodiments may transmit information signaling the operation according to the above-described embodiments, using a structure of a bitstream as shown in the figure.

For example, in generating/reconstructing an octree, additional information on an overlap processing method may be added to and signaled in the SPS, TPS, or the geometry header for each slice. Further, according to embodiments, it may be added to and signaled at other positions in the bitstream.

In generating/reconstructing an octree, virtual bounding box additional information about the position adjustment according to the overlap processing method may be added to and signaled in the block parameter set (BPS), the block parameter information. Further, according to embodiments, it may be added to and signaled at other positions in the bitstream.

In generating/reconstructing an octree, block ID information according to the overlap processing method may be added to and signaled in the geometry node. According to embodiments, it may be added to and signaled at other positions of the bitstream.

The detailed configuration of signaling information will be described below with reference to each figure. In addition, the same signaling information may be included in multiple parameter set positions in the bitstream.

Accordingly, the method/device according to the embodiments may signal the operation according to the embodiments using the bitstream of FIG. 22 and the signaling information of FIG. 23 and subsequent figures. As a result, application/adjustment of region-wise adaptive quantization according to characteristics of content and a service may be provided.

As described above, the point cloud data transmission device (for example, the point cloud data transmission device described with reference to FIGS. 1, 11, and 14) may transmit the encoded point cloud data in the form of a bitstream 3000. The bitstream 3000 may include one or more sub-bitstreams.

The point cloud data transmission device (for example, the point cloud data transmission device described in FIGS. 1, 11, and 14) may divide an image of the point cloud data into one or more packets in consideration of the error of the transmission channel and transmit the divided image over a network. The bitstream 3000 according to the embodiments may include one or more packets (e.g., network abstraction layer (NAL) units). Therefore, even when some packets are lost in a poor network environment, the point cloud data reception device may reconstruct the corresponding video using the remaining packets. The point cloud data may be partitioned into one or more slices or one or more tiles to be processed. The tiles and slices are regions for partitioning a picture of the point cloud data and processing point cloud compression coding. The point cloud data transmission device may provide high-quality point cloud content by processing data corresponding to each region according to the importance of each divided region of the point cloud data. That is, the point cloud data transmission device according to the embodiments may perform point cloud compression coding having better compression efficiency and appropriate latency on data corresponding to a region important to a user.

An image (or picture) of point cloud content according to embodiments is partitioned into basic processing units for point cloud compression coding. According to embodiments, the basic processing unit for point cloud compression coding may include, but is not limited to, a coding tree unit (CTU) and a brick.

According to embodiments, a slice is a region including one or more basic processing units for point cloud compression coding. The slice does not have a rectangular shape. According to embodiments, a slice includes data to be transmitted through a packet. According to embodiments, a tile is a partitioned region of a rectangular shape in an image and includes one or more basic processing units for point cloud compression coding. According to embodiments, one slice may be included in one or more tiles. According to embodiments, one tile may be included in one or more slices.

According to the embodiments, the bitstream 3000 may contain signaling information including an SPS for signaling of a sequence level, a GPS for signaling of geometry information coding, and an APS for signaling of attribute information coding, a TPS for signaling of a tile level, and one or more slices.

The SPS according to the embodiments may include comprehensive information on the entire file, such as a picture resolution and a video format, as encoding information on the entire sequence, such as a profile and a level, and.

According to embodiments, one slice (for example, slice 0 in FIG. 25) includes a slice header and slice data. Slice data may include one geometry bitstream (Geom00) and one or more attribute bitstreams (Attr00, Attr10). The geometry bitstream may contain a header (e.g., a geometry slice header) and a payload (e.g., geometry slice data). According to embodiments, the header of the geometry bitstream may include identification information about a parameter set included in the GPS (geom_geom_parameter_set_id), a tile identifier (geom_tile id), a slice identifier (geom_slice_id), and information about data contained in the payload. The attribute bitstream may include a header (e.g., attribute slice header or attribute brick header) and a payload (e.g., attribute slice data or attribute brick data).

FIG. 23 illustrates an example of information on an overlap processing method in generating/reconstructing an octree according to embodiments.

According to embodiments, the SPS may deliver signaling information, for example, signaling information related to analysis/partitioning and signaling information related to an overlap processing method in octree generation/reconstruction.

area_octree_overlap_handling_type indicates a method of handling overlap in generating/reconstructing an octree. For example, '1=Independent octree construction', '2=Construction of one octree with no position adjustment and with no additional information, '3=Construction of one octree with no position adjustment and with block ID information added to an overlap area', '4=Construction of one octree with position adjustment', and the like may be signaled. The numbers representing the respective indication type or an order of the numbers may be changed according to embodiments.

area_distribution_based_partition_flag indicates whether region partitioning based on distribution analysis is applied.

area_distribution_based_partition_unit indicates a unit in which region partitioning is applied. For example, '1=tile', '2=slice', '3=block', and the like may be signaled. The numbers representing respective units or an order of the numbers may be changed according to embodiments.

area_distribution_based_partition_policy indicates a policy applied to a partitioned area. For example, '1=high density, high QP applied', '2=high density, low QP applied', '3=manual', or the like may be signaled. The numbers indicating the respective policies or the order of the numbers may be changed according to embodiments.

area_distribution_based_partition_method indicates a partitioning method. For example, '1=a partition area range-based setting for uniform partitioning', '2=partition area range setting according to distribution ratio', '3=partition area range setting according to octree node region+distribution ratio', or the like may be signaled. The numbers indicating the respective methods or an order of the numbers may be changed according to embodiments.

area_distribution_based_partition_axes_order indicates an order of axes in constructing a partitioned area. For example, 1=xyz, 2=xzy, 3=yxz, 4=yzx, 5=zxy, 6=zyx, and the like may be signaled. The numbers indicating the respective orders and or the order of the numbers may be changed according to embodiments.

area_distribution_based_partition_absolute_QP_flag indicates whether the QP value of the block is an absolute value or a relative value (offset, delta).

profile_idc indicates a profile to which the bitstream conforms as specified. Bitstreams may not contain values of profile_idc other than those specified in the standard document. Other values of profile_idc are reserved for future use by ISO/IEC.

profile_compatibility_flags equal to 1 indicates that the bitstream conforms to the profile indicated by profile_idc equal to j as specified in the standard. The value of profile_compatibility_flag[j] may be equal to 0 for any value of j that is not specified as an allowed value of profile_idc in the standard.

level_idc indicates a level to which the bitstream conforms as specified in the standard.

Bitstreams shall not contain values of level_idc other than those specified in the standard. Other values of level_idc are reserved for future use by ISO/IEC.

sps_bounding_box_present_flag) equal to 1 indicates that the source bounding box offset and size information is signaled in the SPS. sps_bounding_box_present_flag equal to 0 indicates that the source bounding box information is not signaled.

FIG. 24 illustrates an example of information on an overlap processing method in generating/reconstructing an octree according to embodiments.

The method/device according to the embodiments may transmit signaling information related to analysis/partitioning and signaling information related to an octree generation/reconstruction overlap processing method through a bitstream.

The figure shows the configuration of the SPS.

For details of profile_idc, profile_compatibility_flags, level_idc, sps_bounding_box_present_flag, area_distribution_based_partition_flag, and area_distribution_based_partition_unit, refer to the foregoing descriptions.

FIG. 25 illustrates an example of information on an overlap processing method in generating/reconstructing an octree according to embodiments.

The method/device according to the embodiments may transmit signaling information related to analysis/partitioning and signaling information related to an octree generation/reconstruction overlap processing method through a bitstream.

The figure shows a structure for signaling through the TPS, not the SPS.

area_distribution_based_partition_octree_traverse_index indicates an order value according to an octree traverse method used in encoding.

area_distribution_based_partition_density indicates the density of an area.

area_distribution_based_partition_duplicated_point_merge_flag indicates whether duplicated points are allowed.

area_distribution_based_partition_geometryQP indicates geometry secondary QP. It is applied when the secondary geometry quantization of the encoder and/or the secondary geometry inverse quantization of the decoder described above.

area_distribution_based_partition_attributeQP indicates an attribute QP.

num_bps_set indicates the number of block parameter sets (BPS) belonging to a tile.

bps_block_ids indicates a BPS ID belonging to a tile.

num_tiles specifies the number of tiles signaled for the bitstream. When not present, num_tiles is inferred to be 0.

tile_bounding_box_offset_x[i] indicates the x offset of the i-th tile in the coordinates (e.g., Cartesian coordinates). When not present, the value of tile_bounding_box_offset_x[0] is inferred to be sps_bounding_box_offset_x.Z tile_bounding_box_offset_y[i] indicates the y offset of the i-th tile in the coordinates (e.g., Cartesian coordinates). When not present, the value of tile_bounding_box_offset_y[0] is inferred to be sps_bounding_box_offset_y.

tile_bounding_box_offset_z[i] indicates the z offset of the i-th tile in the coordinates (e.g., Cartesian coordinates). When not present, the value of tile_bounding_box_offset_z[0] is inferred to be sps_bounding_box_offset_z.

tile_bounding_box_size_width[i] indicates the width of the i-th tile in the coordinates (e.g., Cartesian coordinates). When not present, the value of tile_bounding_box_size_width[0] is inferred to be sps_bounding_box_size_width.

tile_bounding_box_size_height[i] indicates the height of the i-th tile in the coordinates (e.g., Cartesian coordinates). When not present, the value of tile_bounding_box_size_height[0] is inferred to be sps_bounding_box_size_height.

tile_bounding_box_size_depth[i] indicates the depth of the i-th tile in the coordinates (e.g., Cartesian coordinates). When not present, the value of tile_bounding_box_size_depth[0] is inferred to be sps_bounding_box_size_depth For area_distribution_based_partition_flag, area_distribution_based_partition_policy, area_distribution_based_partition_method, area_distribution_based_partition_axes_order, area_distribution_based_partition_absolute_QP_flag, area_octree_overlap_handling_type, num_tiles, area_distribution_based_partition_unit, area_distribution_based_partition_method, area_distribution_based_partition_octree_traverse_index[i], area_distribution_based_partition_density[i], area_distribution_based_partition_duplicated_point_merge_flag[i], area_distribution_based_partition_geometryQP[i], area_distribution_based_partition_attributeQP[i], num_bps_set[i], and bps_block_ids[i][j], refer to the description given above.

FIG. 26 illustrates an example of information on an overlap processing method in generating/reconstructing an octree according to embodiments.

The method/device according to the embodiments may transmit signaling information related to analysis/partitioning and signaling information related to an octree generation/reconstruction overlap processing method through a bitstream.

The figure shows a structure for signaling through the geometry slice header (GSH).

gsh_geometry_parameter_set_id specifies the value of the gps_geom_parameter_set_id of the active GPS.

gsh_tile_id specifies the value of the tile id that is referred to by the GSH. The value of gsh_tile_id may be in the range of 0 to XX, inclusive.

Slice ID (gsh_slice_id): Represents an identifier of a slice header for reference by other syntax elements. The value of gsh_slice_id may have a range of 0 to XX (inclusive) (identifies the slice header for reference by other syntax elements. The value of gsh_slice_id shall be in the range of 0 to XX, inclusive).

gsh_box_log 2_scale specifies the scaling factor of the bounding box origin for the slice.

gsh_box_origin_x specifies the x value of the bounding box origin scaled by gsh_box_log 2_scale value.

gsh_box_origin_y specifies the y value of the bounding box origin that scaled by gsh_box_log 2_scale value.

gsh_box_origin_z specifies the z value of the bounding box origin that scaled by gsh_box_log 2_scale value.

gsh_log 2_max_nodesize specifies the value of the variable MaxNodeSize that is used in the decoding process.

gsh_points_number specifies the number of coded points in the slice.

gps_box_present_flag indicates whether a box is present.

gps_gsh_box_log 2_scale_present_flag indicates whether gsh_box_log 2_scale is present.

For area_distribution_based_partition_flag, area_distribution_based_partition_method, area_distribution_based_partition_octree_traverse_index[i], area_distribution_based_partition_unit, area_distribution_based_partition_density[i], area_distribution_based_partition_duplicated_point_merge_flag, area_distribution_based_partition_geometryQP, area_distribution_based_partition_unit, area_octree_overlap_handling_type, num_bps_set[i], and bps_block_ids[i][j], refer to the description given above.

FIG. 27 illustrates an example of information on an overlap processing method in generating/reconstructing an octree and virtual bounding box information regarding position adjustment according to the overlap processing method in generating/reconstructing an octree according to embodiments.

The method/device according to the embodiments may deliver, through a bitstream, signaling information related to analysis/partitioning and signaling information about an octree generation/reconstruction overlap processing method and a virtual bounding box for position adjustment.

The figure shows a structure for signaling through a block parameter set (BPS). In addition, when the overlap processing method is a method of constructing one octree and adjusting the position, virtual bounding box information for position adjustment may be added to the BPS.

block_virtual_bounding_box_offset_x/block_virtual_bounding_box_offset_y/block_virtual_bounding_box_offset_z indicate the position of a virtual bounding box for adjusting the position of each block in coding occupied bits using one octree.

block_virtual_bounding_box_size_width/block_virtual_bounding_box_size_height/block_virtual_bounding_box_size_depth indicate the virtual bounding box size (e.g. width, height, depth) for adjustment of the position of each block in coding occupied bits using one octree.

gsh_reference_tile_id indicates a connected tile ID.

gsh_reference_slice_id indicates a connected slice ID.

bps_blocks_id indicates a unique ID of the BPS.

num_blocks indicates the number of blocks.

block_id indicates a block ID.

block_bounding_box_x/block_bounding_box_y/block_bounding_box_z indicate the left/bottom/front reference positions of the block bounding box.

block_bounding_box_size_width/block_bounding_box_size_height/block_bounding_box_size_depth indicate the block bounding box size (e.g., width, height, depth).

For area_distribution_based_partition_method, area_distribution_based_partition_octree_traverse_index[i], area_octree_overlap_handling_type, area_octree_overlap_handling_type, area_distribution_based_partition_density[i], area_distribution_based_partition_duplicated_point_merge_flag[i], area_distribution_based_partition_geometryQP[i], and area_distribution_based_partition_attributeQP[i], refer to the description given above.

FIG. 28 illustrates an example of block ID information according to an overlap processing method in generating/reconstructing an octree according to embodiments.

The method/device according to the embodiments may deliver, through a bitstream, signaling information about an analysis octree generation/reconstruction overlap processing method and a block ID according to the overlap processing method.

The figure shows a structure for signaling through a geometry node.

When there is a duplicated point in a voxel, bps_reference_block_set_block_id indicates the ID of a block to which the duplicated point belongs.

single_occupancy_flag equal to 1 indicates that the current node contains a single child node. single_occupancy_flag equal to 0 indicates the current node may contain multiple child nodes.

occupancy_idx identifies the index of the single occupied child of the current node in the geometry octree child node traversal order). When present, the following applies: OccupancyMap=1<<occupancy_idx.

num_points_eq1_flag equal to 1 indicates that the current child node contains a single point. num_points_eq1_flag equal to 0 indicates that the current child node contains at least two points. When not present, the value of num_points_eq1_flag is inferred equal to 1.

num_points_minus2 plus 2 indicates the number of points represented by the current child node.

The variable NeighbourPattern may be set as follows:

NeighbourPattern=$rN|(lN<<1)|(fN<<2)|(bN<<3)|(dN<<4)|(uN<<5)$

For each node, the variables rN, lN, fN, bN, uN, and dN are derived as follows:

$rN$=GeometryNodeOccupancyCnt[depth][$xN$+1][$yN$][$zN$]!=0;

$lN$=GeometryNodeOccupancyCnt[depth][$xN$−1][$yN$][$zN$]!=0;

$bN$=GeometryNodeOccupancyCnt[depth][$xN$][$yN$+1][$zN$]!=0;

$fN$=GeometryNodeOccupancyCnt[depth][$xN$][$yN$−1][$zN$]!=0;

$uN$=GeometryNodeOccupancyCnt[depth][$xN$][$yN$][$zN$+1]!=0; and $dN$=GeometryNodeOccupancyCnt[depth][$xN$][$yN$][$zN$−1]!=0 . . . .

single_occupancy_flag equal to 1 indicates that the current node contains a single child node. single_occupancy_flag equal to 0 indicates the current node may contain multiple child nodes.

MaxGeometryOctreeDepth: indicates the octree depth unique_geometry_points_flag equal to 1 indicates that all output points have unique positions. unique_geometry_points_flag equal to 0 indicates that the output points may have same positions.

GeometryNodeChildrenCnt identifies the number of child nodes in the array GeometryNodeChildren[ ]. The array GeometryNodeChildren[i] identifies the index of the i-th occupied child node of the current node.

For unique_geometry_points_flag, area_distribution_based_partition_flag, area_distribution_based_partition_unit, and area_octree_overlap_handling_type, refer to the description given above.

Figure 29:
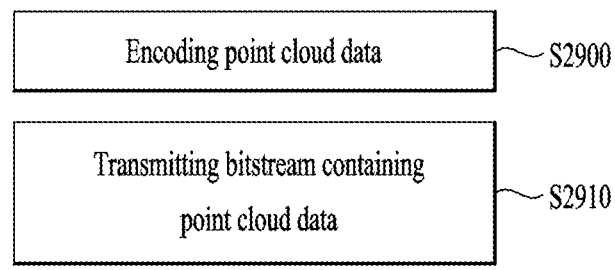
FIG. 29 illustrates an example of a point cloud data transmission method according to embodiments.

FIG. 29 illustrates an example of a point cloud data transmission method according to embodiments.

S2900: the point cloud data transmission method according to the embodiments may include encoding point cloud data. For the detailed encoding process, refer to the descriptions related to the transmission device 10000 of FIG. 1, the point cloud video encoder 10002 of FIG. 1, the encoding 20001 of FIG. 2, the point cloud encoder 40000 to 40012 of FIG. 4, the point cloud encoder 12000 to 12011 of FIG. 12, the point cloud encoding process of FIGS. 14 to 16, a process associated with the XR device of FIG. 17, and the like.

S2910: the point cloud data transmission method according to the embodiments may include transmitting a bitstream containing point cloud data. For the detailed transmission process, refer to the description related to the transmitter 10003 of FIG. 1, the transmission 20002 of FIG. 2, the point cloud decoder of FIG. 10, the point cloud decoder of FIG. 11, the point cloud encoder 12012 of FIG. 12, the point cloud delivery process of FIGS. 14 to 16, a process associated with the XR device of FIG. 17, and the like.

Each step may generate and transmit the bitstream/signaling information according to FIGS. 22 to 28 described above.

The point cloud data transmission method according to the embodiments may be combined with the embodiments described in the present disclosure to provide an effect of applying/adjusting region-wise adaptive quantization according to the characteristics of the content and the service.

Figure 30:
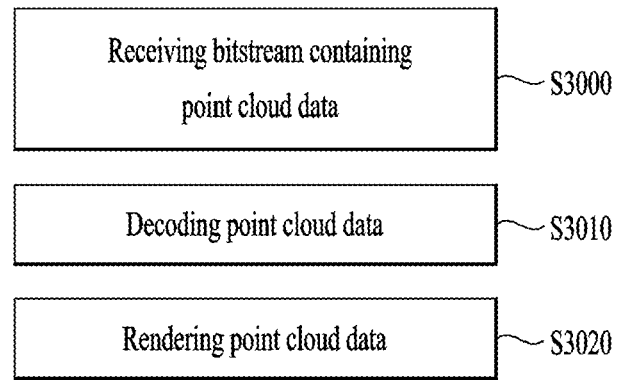
FIG. 30 illustrates an example of a point cloud data reception method according to embodiments.

FIG. 30 illustrates an example of a point cloud data reception method according to embodiments.

S3000: the point cloud data reception method according to the embodiments may include receiving a bitstream containing point cloud data. For the detailed reception process, reference may be made to the reception device 10004 of FIG. 1, the receiver 10005 of FIG. 1, the transmission 20002 of FIG. 2, the receiver 13000 of FIG. 13, and the delivery and reception processes of FIGS. 14 to 16.

S3010: the point cloud data reception method according to the embodiments may include decoding the point cloud data. For the detailed decoding process, reference may be made to the point cloud video decoder 10006 of FIG. 1, the decoding 20003 of FIG. 2, the point cloud decoder of FIG. 10, the point cloud decoder of FIG. 11, the point cloud decoder 13000 to 13011 of FIG. 13, the point cloud decoder of FIG. 21, and the like.

S3020: the point cloud data reception method according to the embodiments may include rendering the point cloud data. For the detailed rendering process, reference may be made to the renderer 10007 of FIG. 1, the rendering 20004 of FIG. 2, the renderer 13011 of FIG. 13, the display/rendering process of FIGS. 14 to 16, the XR device associated process of FIG. 17, and the like.

Each step may receive the bitstream/signaling information according to FIGS. 22 to 28 described above, and process each operation based thereon.

The point cloud data reception method according to the embodiments may be combined with the embodiments described in the present disclosure to provide an effect of applying/adjusting region-wise adaptive quantization according to the characteristics of the content and the service.

Embodiments have been described in terms of a method and/or a device. The description of the method and the description of the device may complement each other.

Each part, module, or unit described above may be software, a processor, or a hardware part that executes successive procedures stored in a memory (or storage unit). The respective operations described in the embodiments above may be performed by software, processors or hardware parts. Each module/block/unit described in the examples above may operate as a processor, software, or hardware. In addition, the methods proposed in the embodiments may be executed by code. The code may be written in a recoding medium readable by a processor so that the code may be read by the processor provided by the apparatus.

Although the description of the present disclosure is explained with reference to each of the accompanying drawings for simplicity, it is possible to design new examples by merging the examples shown in the accompanying drawings with each other. If a recording medium readable by a computer, in which programs for executing the examples mentioned in the foregoing description are recorded, is designed by those skilled in the art, it may fall within the scope of the appended claims and their equivalents.

The devices and methods according to the embodiments may be non-limited by the configurations and methods of the examples mentioned in the foregoing description. The examples mentioned in the foregoing description may be configured in a manner of being selectively combined with one another entirely or in part to enable various modifications.

Although the preferred embodiments of the present disclosure have been described with reference to the drawings, those skilled in the art will appreciate that various modifications and variations may be made in the embodiments without departing from the spirit or scope of the embodiments disclosed in the appended claims. Such modifications are not to be understood individually from the technical idea or viewpoint of the embodiments It will be appreciated by those skilled in the art that various modifications and variations may be made in the embodiments without departing from the spirit or scope of the embodiments. Thus, it is intended that the present disclosure cover the modifications and variations of the embodiments provided they come within the scope of the appended claims and their equivalents.

In the present disclosure, both an apparatus disclosure and a method disclosure are mentioned, and the descriptions of both the apparatus and method disclosures may be applied to complement each other.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition.

Mode for Disclosure

As described above, related details have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

What is claimed is:

1. A method of transmitting point cloud data, the method comprising:
   encoding the point cloud data; and
   transmitting a bitstream containing the point cloud data,
   wherein the encoding the point cloud data includes:
       geometry encoding geometry information of the point cloud data based on a tree including the point cloud data, and
   wherein the geometry information is quantized based on a quantization parameter, and an offset is further applied to the point cloud data to scale a position of the geometry information.

2. The method of claim 1, further comprising:
   partitioning a space of the point cloud data based on a partition unit,
   wherein the encoding comprises:
   encoding attribute information about the point cloud data,
   wherein the encoding of the geometry information comprises:
   generating an octree for the point cloud data.

3. The method of claim 2, wherein, when the partitioning unit is a block, the generating of the octree comprises:
   constructing the octree on a basis of the block; or
   constructing the octree on a basis of a slice including the block.

4. The method of claim 2, wherein the generating of the octree comprises:
   when the partition unit is a block, constructing the octree on a basis of a slice including the block; and
   when the slice includes a first block and a second block overlapping each other, generating ID information about points in an overlapping area.

5. The method of claim 2, wherein, the generating of the octree comprises:
   when the partition unit is a block, constructing the octree on a basis of a slice including the block; and
   when the slice includes a first block and a second block overlapping each other, adjusting a position of the second block to an area of a virtual block based on an offset value, the virtual block not overlapping the first block.

6. A device for transmitting point cloud data, the device comprising:
   an encoder configured to encode the point cloud data; and
   a transmitter configured to transmit a bitstream containing the point cloud data,
   wherein the encoder further includes:
       a geometry encoder configured to geometry encode geometry information of the point cloud data based on a tree including the point cloud data, and
   wherein the geometry information is quantized based on a quantization parameter, and an offset is further applied to the point cloud data to scale a position of the geometry information.

7. The device of claim 6, further comprising:
   a spatial partitioner configured to partition a space of the point cloud data based on a partition unit,
   wherein the encoder comprises:
   an attribute encoder configured to encode attribute information about the point cloud data,
   wherein the geometry encoder comprises:
   an octree generator configured to generate an octree for the point cloud data.

8. The device of claim 7, wherein, when the partitioning unit is a block, the octree generator is configured to:
   construct the octree on a basis of the block; or
   construct the octree on a basis of a slice including the block.

9. The device of claim 7, wherein the octree generator is configured to:
   when the partition unit is a block, construct the octree on a basis of a slice including the block; and
   when the slice includes a first block and a second block overlapping each other, generate ID information about points in an overlapping area.

10. The device of claim 7, wherein the octree generator is configured to:
    when the partition unit is a block, construct the octree on a basis of a slice including the block; and
    when the slice includes a first block and a second block overlapping each other, adjust a position of the second block to an area of a virtual block based on an offset value, the virtual block not overlapping the first block.

11. A method of receiving point cloud data, the method comprising:
    receiving a bitstream containing the point cloud data; and
    decoding the point cloud data,
    wherein the decoding the point cloud includes:
        geometry decoding geometry information of the point cloud data based on a tree including the point cloud data, and wherein an offset is applied to the point cloud data to scale a position of the geometry information, and the geometry information is de-quantized based on a quantization parameter.

12. The method of claim 11, wherein the decoding comprises:
decoding attribute information of the point cloud data,
wherein the decoding of the geometry information comprises:
reconstructing an octree for the point cloud data.

13. The method of claim 12, wherein the reconstructing of the octree comprises:
checking whether the point cloud data is data partitioned based on a tile or a slice.

14. The method of claim 12, wherein, when the point cloud data is partitioned based on a block, the reconstructing of the octree comprises:
checking whether a type of overlap applied to the point cloud data is an independent octree or an octree excluding position adjustment and additional information.

15. The method of claim 12, wherein, when the point cloud data is partitioned based on a block, the reconstructing of the octree comprises:
checking whether a type of overlap applied to the point cloud data is an octree excluding position adjustment and including additional block information or an octree including the position adjustment;
reconstructing a virtual position of the block for the point cloud data based on signaling information for each block contained in the bitstream.

16. A device for receiving point cloud data, the device comprising:
a receiver configured to receive a bitstream containing the point cloud data; and
a decoder configured to decode the point cloud data,
wherein the decoder includes:
a geometry decoder configured to geometry decode geometry information of the point cloud data based on a tree including the point cloud information, and
wherein an offset is applied to the point cloud data to scale a position of the geometry information, and the geometry data is de-quantized based on a quantization parameter.

17. The device of claim 16, wherein the decoder comprises:
an attribute decoder configured to decode attribute information of the point cloud data,
wherein the geometry decoder comprises:
an octree reconstructor configured to reconstruct an octree for the point cloud data.

18. The device of claim 17, wherein the octree reconstructor checks whether the point cloud data is data partitioned based on a tile or a slice.

19. The device of claim 17, wherein, when the point cloud data is partitioned based on a block, the octree reconstructor is configured to check whether a type of overlap applied to the point cloud data is an independent octree or an octree excluding position adjustment and additional information.

20. The device of claim 17, wherein, when the point cloud data is partitioned based on a block, the octree reconstructor is configured to:
check whether a type of overlap applied to the point cloud data is an octree excluding position adjustment and including additional block information or an octree including the position adjustment;
reconstruct a virtual position of the block for the point cloud data based on signaling information for each block contained in the bitstream.

* * * * *